United States Patent
Phillips

(10) Patent No.: US 8,730,012 B2
(45) Date of Patent: May 20, 2014

(54) ENABLING IDENTIFICATION TOKEN FOR A TIMED PERIOD

(75) Inventor: Simon Phillips, York (GB)

(73) Assignee: MasterCard International Incorporated, Purchase, NY (US)

( * ) Notice: Subject to any disclaimer, the term of this patent is extended or adjusted under 35 U.S.C. 154(b) by 1174 days.

(21) Appl. No.: 11/852,763

(22) Filed: Sep. 10, 2007

(65) Prior Publication Data

US 2008/0165006 A1    Jul. 10, 2008

Related U.S. Application Data

(60) Provisional application No. 60/878,989, filed on Jan. 5, 2007.

(51) Int. Cl.
*H04Q 5/22*    (2006.01)

(52) U.S. Cl.
USPC ........................................................ 340/10.1

(58) Field of Classification Search
USPC ................. 340/10.1, 539.11, 572.8; 307/141; 705/26.1, 18
See application file for complete search history.

(56) References Cited

U.S. PATENT DOCUMENTS

| | | | |
|---|---|---|---|
| 5,276,311 A | 1/1994 | Hennige | |
| 5,585,787 A | 12/1996 | Wallerstein | |
| 5,955,961 A | 9/1999 | Wallerstein | |
| 6,315,195 B1 | 11/2001 | Ramachandran | |
| 6,353,811 B1 | 3/2002 | Weissman | |
| 6,561,432 B1 | 5/2003 | Vedder et al. | |
| 6,631,849 B2 | 10/2003 | Blossom | |
| 6,715,679 B1 | 4/2004 | Infosino | |
| 6,764,005 B2 | 7/2004 | Cooper | |
| 6,766,952 B2 | 7/2004 | Luu | |

(Continued)

FOREIGN PATENT DOCUMENTS

| | | |
|---|---|---|
| WO | 98/33193 A1 | 7/1998 |
| WO | 99/38173 A1 | 7/1999 |
| WO | 00/79546 A1 | 12/2000 |

OTHER PUBLICATIONS

International Standard, "Identification cards—Physical Characteristics", ISO/IEC 7810, Third Edition, Nov. 1, 2003, 18pgs.

(Continued)

*Primary Examiner* — Vernal Brown
(74) *Attorney, Agent, or Firm* — Buckley, Maschoff & Talwalkar LLC

(57) ABSTRACT

In accordance with some embodiments, an apparatus includes: a support structure; a storage circuit mounted in or on the support structure, the storage circuit for storing data; an antenna mounted in or on the support structure and coupled to the storage circuit for selectively transmitting the data; a switch mounted in or on the support structure, the switch being for initiating a time period in which the apparatus is enabled; and a timing circuit mounted in or on the support structure, the timing circuit being responsive to the switch for setting an end point to the time period; wherein the apparatus is operative to perform data exchange with a reader via the antenna only during the time period. In accordance with some embodiments, a method of operating an identification token includes detecting actuation of a switch on the identification token; in response to the detected actuation of the switch: enabling the identification token; and initiating a time period; determining an end point of the time period; and disabling the identification token if the end point of the time period is reached.

22 Claims, 12 Drawing Sheets

(56) References Cited

U.S. PATENT DOCUMENTS

| | | | |
|---|---|---|---|
| 6,863,220 | B2 | 3/2005 | Selker |
| 6,978,940 | B2 | 12/2005 | Luu |
| 6,992,952 | B2 * | 1/2006 | Endo et al. ............... 368/10 |
| 7,012,504 | B2 | 3/2006 | Tuttle |
| 7,143,419 | B2 | 11/2006 | Fischer et al. |
| 7,204,412 | B2 | 4/2007 | Foss, Jr. |
| 7,264,172 | B2 | 9/2007 | Amiot et al. |
| 7,400,248 | B2 * | 7/2008 | Yarvis ............... 340/572.1 |
| 7,586,215 | B2 * | 9/2009 | Hattori et al. ............ 307/141 |
| 7,731,094 | B2 * | 6/2010 | Phillips ................ 235/492 |
| 7,775,442 | B2 * | 8/2010 | Saarisalo ............... 235/487 |
| 2003/0132301 | A1 | 7/2003 | Selker |
| 2004/0124248 | A1 | 7/2004 | Selker |
| 2004/0223305 | A1 | 11/2004 | Amoit et al. |
| 2005/0258245 | A1 | 11/2005 | Bates et al. |
| 2006/0137464 | A1 | 6/2006 | Baudendistel |
| 2006/0289657 | A1 * | 12/2006 | Rosenberg ............ 235/492 |
| 2008/0011859 | A1 | 1/2008 | Phillips |
| 2008/0035740 | A1 | 2/2008 | Tanner |
| 2008/0054078 | A1 | 3/2008 | Tanner |
| 2008/0061148 | A1 | 3/2008 | Tanner |
| 2008/0061149 | A1 | 3/2008 | Tanner |
| 2008/0061150 | A1 | 3/2008 | Phillips |
| 2008/0061151 | A1 | 3/2008 | Phillips |
| 2008/0121707 | A1 | 5/2008 | Phillips et al. |
| 2009/0065575 | A1 | 3/2009 | Phillips et al. |
| 2009/0065587 | A1 | 3/2009 | Phillips |
| 2009/0100511 | A1 | 4/2009 | Phillips et al. |

OTHER PUBLICATIONS

"The Design of a Smart Card Interface Device: Chapter 5—Smart Card Protocols and ISO 7816-4", Retrieved Feb. 22, 2007. Retrieved from URL: http://www.cs.uct.ac.za/Research/DNA/SOCS/rchap5.html, 10pgs.

Jay MacDonald, "Calling Dick Tracy: Credit card watches debut", Mar. 24, 2009, Credit Cards.com, 2pgs.

Leslie Berlin, "Cellphones as Credits? Americans Must Wait", Jan. 24, 2009, The New York Times, [Retrieved Jan. 26, 2009]. Retrieved from URL: http://www.nytimes.com/2009/01/25/business/25proto.html?_r=1&em, 3pgs.

"Speedpass and Timex offer payments-by-wristwatch", Dec. 10, 2002, [Retrieved Mar. 31, 2009]. Retrieved from URL: http://www.finextra.com/fullstory.asp?id=7530, 2pgs.

"JCB pilots contactless payments", Apr. 1, 2004, [Retrieved Mar. 31, 2009]. Retrieved from URL: http://www.finextra.com/fullstory.asp?id=11549, 2pgs.

JCB delivers contactless Offica service over Casio wrist watch, Jun. 14, 2004, [Retrieved Mar. 31, 2009]. Retrieved from URL: http://www.finextra.com/fullstory.asp?id=11994, 2pgs.

"MasterCard launches OneSmart Paypass", Nov. 2, 2004, [Retrieved Mar. 31, 2009]. Retrieved from URL: http://www.finextra.com/fullstory.asp?id=12788, 2pgs.

"Visa launches contactless payments system in US", Feb. 25, 2005, [Retrieved Mar. 31, 2009]. Retrieved from URL: http://www.finextra.com/fullstory.asp?id=13291, 2pgs.

"Contact sports fans go contactless with MasterCard PayPass", Feb. 22, 2005, [Retrieved Mar. 31, 2009]. Retrieved from URL: http://www.finextra.com/fullstory.asp?id=13291, 2pgs.

Ian Rowley (in Tokyo), "$5,000? Put It on My Cell", Jun. 6, 2005, Asian Business, Business Week, [Retrieved Mar. 31, 2009]. Retrieved from URL: http://www.businessweek.com/print/magazine/content/05_23/b3936060.htm?chan=gl, 2pgs.

"Citibank to roll out MasterCard PayPass contactless keyring", Aug. 25, 2005, [Retrieved Mar. 31, 2009]. Retrieved from URL: http://www.finextra.com/fullstory.asp?id=14154, 2pgs.

Michael Fitzgerald, "Use your Cell Phone Instead of Your Credit Card", Monday, Sep. 19, 2005, PC World Communications, Inc., 2ps.

"Chinatrust releases PayPass-enabled wrist watch", Jun. 7, 2006, [Retrieved Mar. 31, 2009]. Retrieved from URL: http://www.finextra.com/fullstory.asp?id=15406, 2pgs.

"Turkey's Garanti Bank to issue PayPass wrist watch", May 8, 2007, [Retrieved Mar. 31, 2009]. Retrieved from URL: http://www.finextra.com/fullstory.asp?id=16902, 2pgs.

"Turkey gets wristwatch with built-in credit card", May 11, 2007, [Retrieved Mar. 30, 2009]. Retrieved from URL: http://www.wristdreams.com/archives/2007/05/turkey_gets_wri.html, 4pgs.

"Wristwatch Equipped With a Built-In Credit Card", Thursday, May 17, 2007, [Retrieved Mar. 30, 2009]. Retrieved from URL: http://www.crookedbrains.net/2007/05/wristwatch-equipped-with-built-in.html, 4pgs.

"Wristwatch With Built-In Credit Card", Saturday, May 26, 2007, [Retrieved Mar. 30, 2009]. Retrieved from URL: http://www.funniestgadgets.com/2007/05/26/wristwatch-with-built-in-credit-card/, 3pgs.

Karen Bruno, "Artist peddling designs for your credit card", Aug. 8, 2007, [Retrieved Mar. 31, 2009]. Retrieved from URL: http://www.creditcards.com/credit-card-news/credit-card-designs-and-covers-1273.php, 3pgs.

"Credit Card Rings (1964)", Thursday, Sep. 13, 2007, Paleo-Future, [Retrieved Mar. 30, 2009]. Retrieved from URL: http://www.paleofuture.com/blog/2007/9/14/credit-card-rings-1964.html, 5pgs.

"Altair unveils pre-paid contactless PayPass wrist watch", Jun. 27, 2008, [Retrieved Mar. 31, 2009]. Retrieved from URL: http://www.finextra.com/fullstory.asp?id=18654, 3pgs.

* cited by examiner

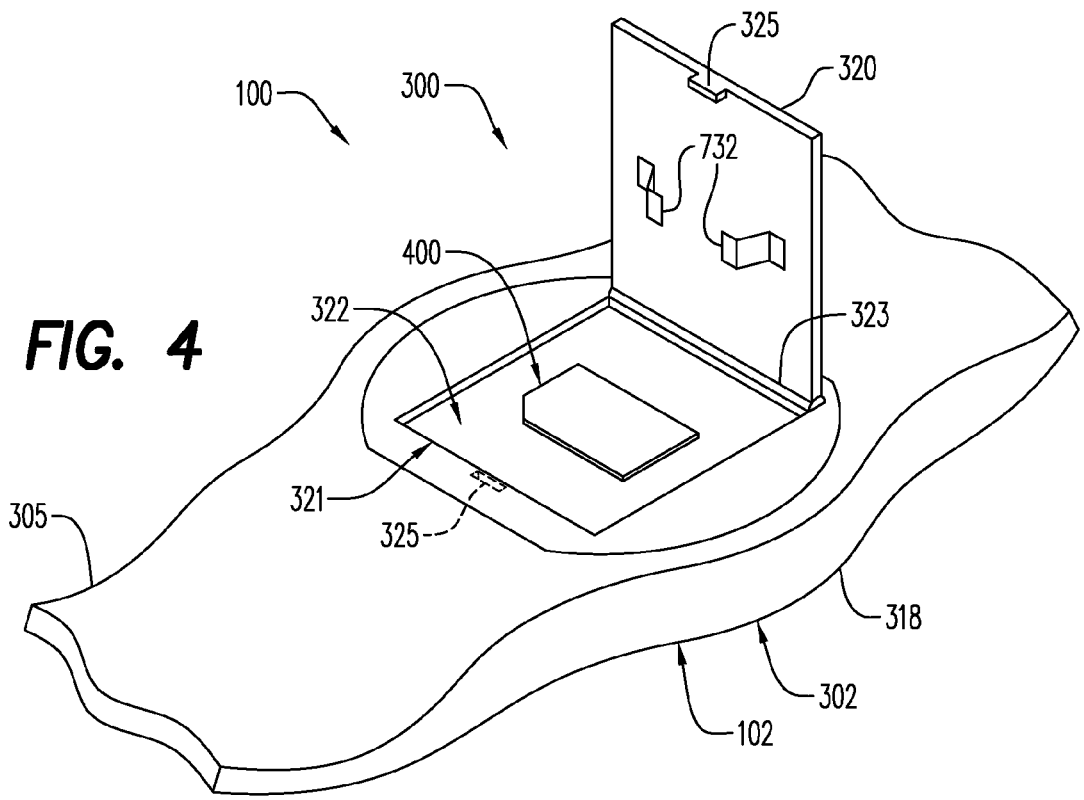
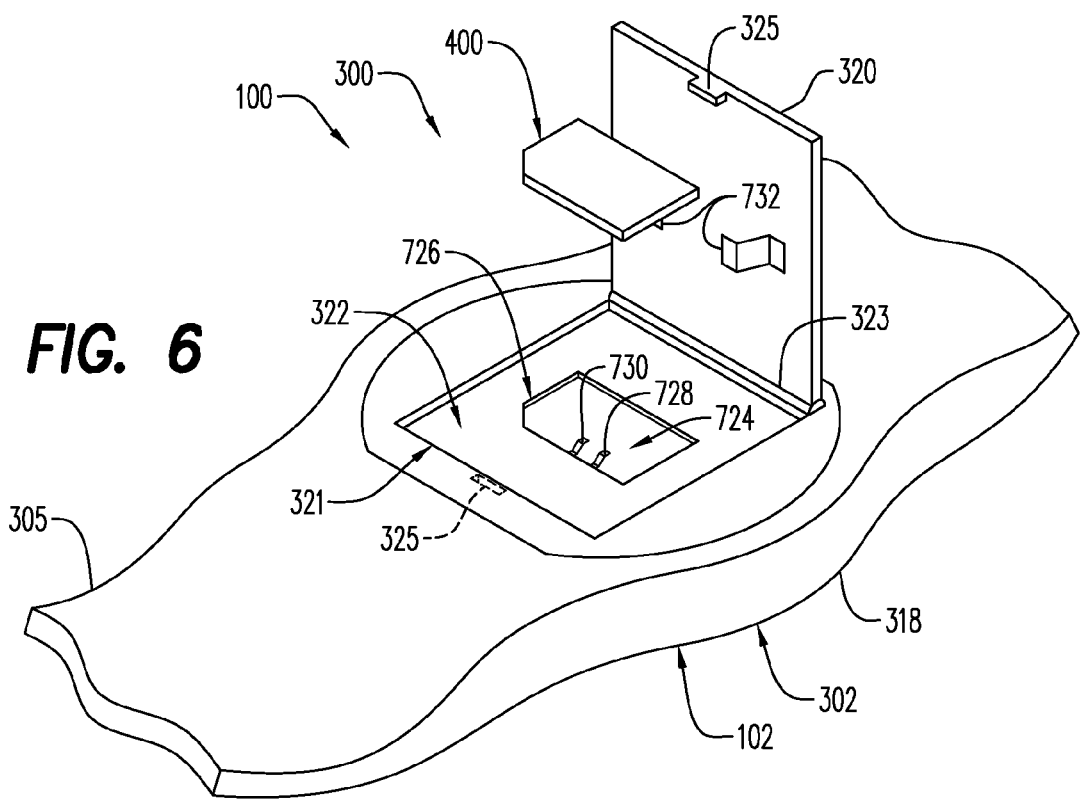

US 8,730,012 B2

ENABLING IDENTIFICATION TOKEN FOR A TIMED PERIOD

CROSS REFERENCE TO RELATED APPLICATION

This application claims priority under 35 U.S.C. §119 to U.S. Provisional Patent Application Ser. No. 60/878,989, entitled "ENABLING PROXIMITY PAYMENT DEVICE FOR A TIMED PERIOD", filed in the name of Simon Phillips on Jan. 5, 2007, the contents of which are hereby incorporated by reference.

BACKGROUND

Proximity payment devices are in widespread use. Many are card-shaped and resemble a standard credit card in appearance although other form factors are also used. It has also been proposed to equip consumer devices, such as wristwatches and the like, with proximity payment capabilities.

A well known standard for proximity payment devices has been promulgated by MasterCard International Incorporated, the assignee hereof, and is referred to as "PayPass". Proximity payment devices typically include a radio frequency identification (RFID) integrated circuit (IC) embedded in a plastic body or contained in a housing. An antenna is also embedded in the plastic body or housing. The antenna may allow the proximity payment device to receive a power signal from a point of sale terminal. The antenna is also used by the internal circuits to communicate information with the POS terminal, such as the payment account number, and possibly other information as well.

One issue faced by account holders with proximity payment devices is that a wrongdoer may attempt to interrogate proximity payment devices to download account numbers therefrom without their knowledge. It has been proposed to protect against this possibility by preventing proximity payment devices from transmitting the account numbers unless the user is pressing a switch on the device at the time that the device is interrogated. However, if this approach were applied to a proximity payment device provided as a wristwatch, bracelet or wristband, the user would need to engage in an awkward two-handed maneuver to have the device read by the POS terminal.

BRIEF DESCRIPTION OF THE DRAWINGS

FIG. 4 is a schematic perspective view of a portion of the proximity payment device of FIG. 3, according to some embodiments, with a case in an open state.

FIG. 6 is a schematic, partially exploded perspective view of a portion of the proximity payment device of FIG. 3, according to some embodiments, with the case in an open state and the small IC card removed.

DETAILED DESCRIPTION

Figure 1:
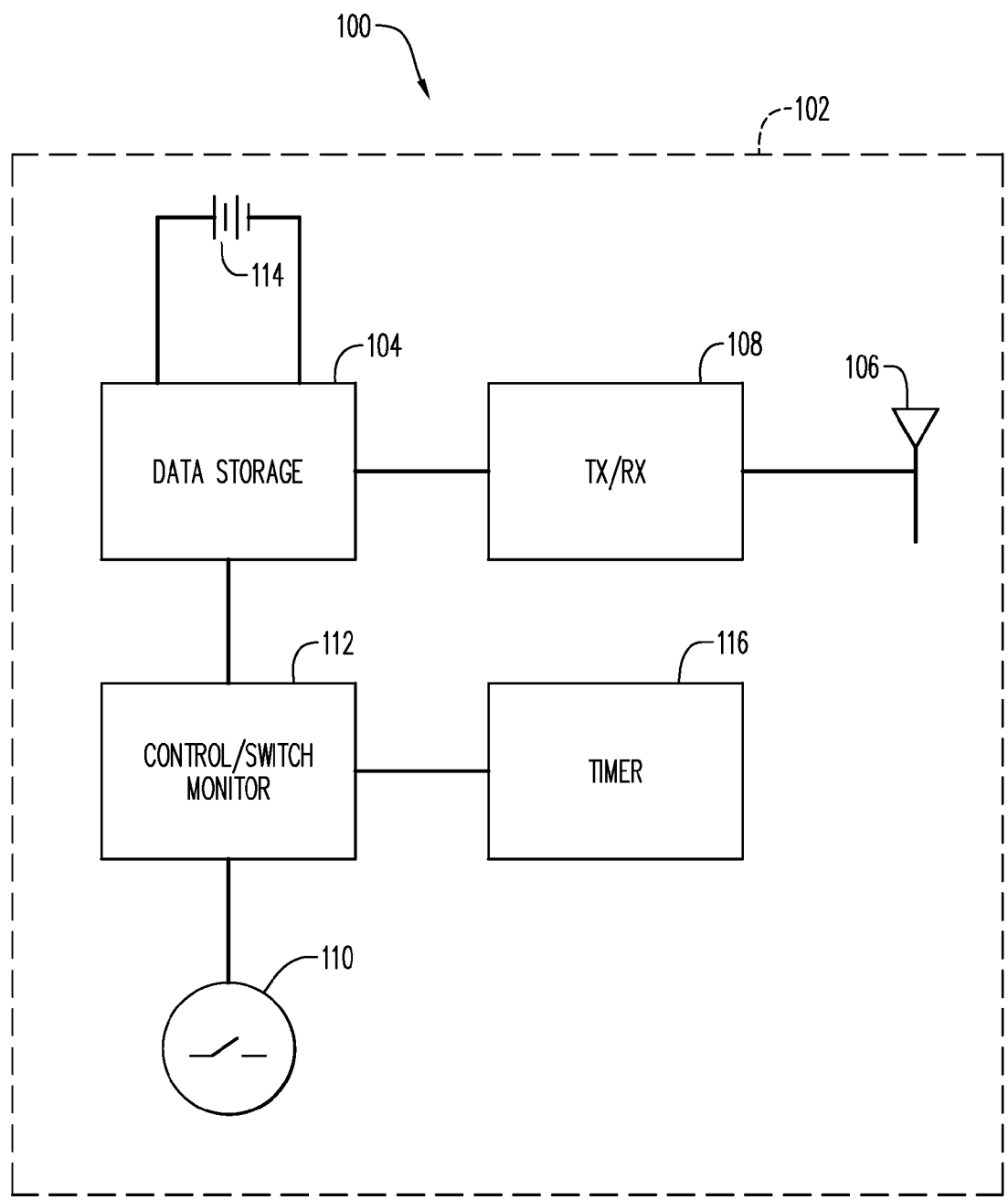
FIG. 1 is a schematic block diagram representation of a proximity payment device provided according to some embodiments.

FIG. 1 is a schematic block diagram representation of a proximity payment device 100 provided according to some embodiments. Referring to FIG. 1, the proximity payment device 100 may include a housing in which some or all other components of the proximity payment device are contained and/or a plastic body in which some or all other components of the proximity payment device are embedded. Such housing and/or plastic body are represented in FIG. 1 by a dashed rectangle 102.

Regardless of whether the proximity payment device includes a housing and/or a plastic body, the structure supporting the proximity payment device components will herein be referred to as the "device case" or as a "support structure". Notably, a housing supports a component of the proximity payment device if the component is at least (i) partially and/or entirely contained in, mounted on, mounted in, installed on, installed in and/or embedded in the housing and/or (ii) partially and/or entirely contained in, mounted on, mounted in, installed on, installed in and/or embedded in a component that is supported by the housing. A plastic body supports a component of the proximity payment device if the component is at least (i) partially and/or entirely contained in, mounted on, mounted in, installed on, installed in and/or embedded in the plastic body and/or (ii) partially and/or entirely contained in, mounted on, mounted in, installed on, installed in and/or embedded in a component that is supported by the plastic body. As used herein and in the appended claims, the term "embedded" includes both completely and partially embedded.

The proximity payment device 100 also includes a data storage circuit 104 installed in and/or embedded in the device case 102. In some embodiments, the data storage circuit 104 may be a simple memory device capable only of responding to a pre-defined set of commands, or a secure microcontroller capable of executing a pre-defined program. In both instances, these circuits may store the payment account details necessary for the communication with the POS terminal. In accordance with known practices, additional data may be stored in the data storage circuit in some embodiments.

The proximity payment device 100 further includes an antenna 106, which in some embodiments, may be provided in a conventional manner. For example, the antenna 106 may be a loop antenna arranged in and/or supported on the proximity payment device 100. Alternatively, the antenna 106 may be of a different type and/or configuration. In some embodiments, the antenna 106 may be operative to receive interrogation and power signals (which may be the same signal) from a proximity coupling device of a POS terminal and to transmit payment card account number information and/or other information to the proximity coupling device. In some embodiments, the antenna 106 may be operative to receive interrogation and power signals and to transmit payment card account number information and/or other information to the proximity coupling device in accordance with the above-mentioned PayPass standard.

In addition, transmit/receive circuitry 108, which in some embodiments may be provided in a conventional manner, couples the data storage circuit 104 to the antenna 106 to allow the data storage circuit 104 to transmit data signals to the POS terminal via the antenna 106 and/or to receive data signals and/or an interrogation signal from the POS terminal via the antenna 106. Although the transmit/receive circuitry 108 is shown as separate from the data storage circuit 104, in practice the transmit/receive circuitry 108 may be integrated with the data storage circuit 104. For example, the data storage circuit 104 and the transmit/receive circuit 108 may be included in an RFID IC, which is not separately shown in FIG. 1.

The proximity payment device 100 also includes a switch 110 and a control/switch monitor circuit 112 which is coupled to the switch 110. The switch 110 may be actuated (e.g., pressed) by the user's thumb or finger to provide a signal to the control/switch monitor circuit 112. The term "switch" refers to any manually actuatable device for registering a change of state. The term "actuation" or related words need not necessarily imply movement of one part of a switch relative to another part of the switch. In some embodiments the switch may be embodied as a push button switch of a type conventionally provided on a wristwatch to control or access functions of the wristwatch.

Still further, the proximity payment device 100 may include a battery 114, which may be coupled directly or indirectly to, and may supply power to, the control/switch monitor circuit 112, the data storage circuit 104 and also possibly to the transmit/receive circuit 108. In some embodiments, where the proximity payment device 100 is a wristwatch, the battery 114 may be the watch battery, which also supplies power to nonpayment-related components (not shown) of the watch.

Since the control/switch monitor circuit 112 may be powered by the battery 114, the control/switch monitor circuit 112 may be operative to detect a change in state (actuation) of the switch 110 at times when the proximity payment device is not being interrogated by a POS terminal.

The proximity payment device 100 may also include a timer circuit 116 which may be coupled to the control/switch monitor circuit 112 to define a period of time of predetermined length commencing with a point in time at which the control/switch monitor circuit 112 detects actuation of the switch 110. The timer may be an electronic circuit that includes a digital counter and/or a circuit of a kind used in a conventional digital watch to measure passage of time. Alternatively, timer circuit 116 may be an electrical circuit that includes a capacitor that is initially charged to start the time period and then is discharged over time to measure out the time period.

In some embodiments, the control/switch monitor circuit 112 and/or the timer circuit 116 may be integrated in an RFID IC (not separately shown in FIG. 1) with the data storage circuit 104 and the transmit/receive circuit 108.

Except for the timed enablement feature described herein, in some embodiments, the RFID IC may operate generally in accordance with conventional practices (such as those contained in the "PayPass" standard) related to exchange of data by a proximity payment device with a point of sale terminal.

In some embodiments, the timer circuit 116 may be omitted, in favor of the switch 110 being of a type that mechanically retains an actuated state for a predetermined period of time and then changes back to an unactuated state upon expiration of the period of time. With such a switch, the control/switch monitor circuit 112 may be configured to read the present state of the switch 110, but need not do so except when the proximity payment device is being interrogated. The power for the control/switch monitor circuit accordingly may come from the interrogation signal, and the battery 114 may be omitted.

Example mechanical switches that remain actuated for a period of time and then change back to an unactuated state may include a pneumatic-delay switch of the kind disclosed in U.S. Pat. No. 6,863,220 to Selker or a switch formed from a material having a shape memory which returns to its original shape over a period of time after being actuated to a deformed shape.

Figure 2:
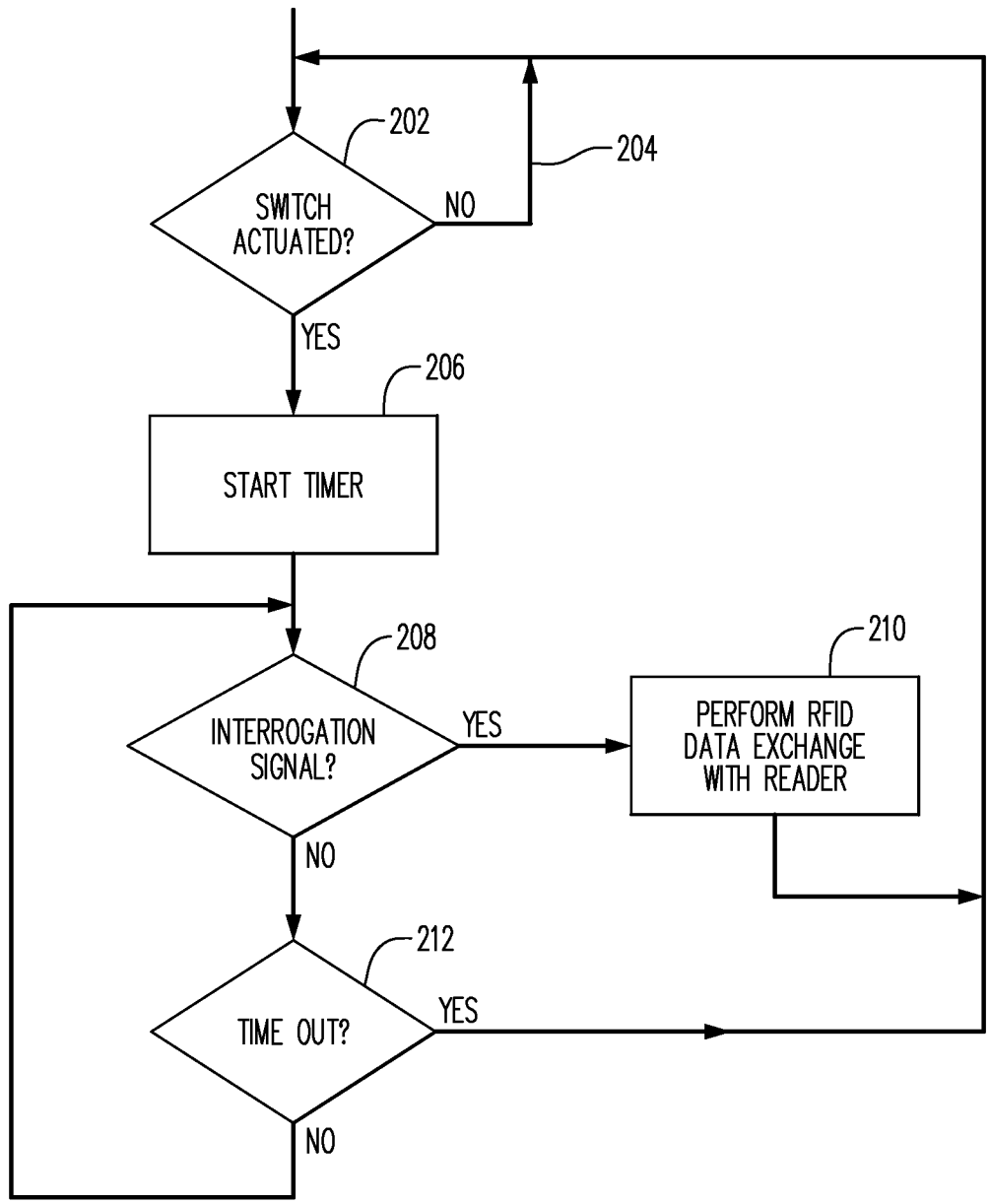
FIG. 2 is a flow chart that illustrates a process performed by the proximity payment device of FIG. 1.

FIG. 2 is a flow chart that illustrates a process that may be performed by the proximity payment device 100, in accordance with some embodiments, while power is applied to at least a portion of the circuitry shown in FIG. 1.

At 202 in FIG. 2, the control/switch monitor circuit 112 determines whether the switch 110 has been actuated. In some embodiments, the control/switch monitor circuit 112 is configured and/or programmed and/or interacts with the data storage circuit 104 and/or the transmit receive circuit 108 such that the proximity payment device 100 is not operative to transmit the device payment account number and/or otherwise to interact with a POS terminal unless and until the control/switch monitor circuit 112 detects actuation of the switch 110. As indicated at 204, the proximity payment device 100 may idle in the condition in which it is not enabled to transmit the account number so long as the actuation of the switch 110 is not detected. The proximity payment device 100 may also be considered to be disabled or not enabled so long as it is in this condition.

If the control/switch monitor circuit 112 determines at 202 that the switch 110 has been actuated, then the proximity payment device is enabled, and a time period is initiated (as indicated at 206) during which the proximity payment device may remain in the enabled condition. With the start of the time period, the timer circuit 116 may be initialized to measure out, and thereby determine a concluding end point of, the time period. For example, a counter circuit (which may be part of the timer circuit 116 but is not separately shown) may be caused to start counting up from zero by counting clock pulses (from a clock circuit which is not separately shown) and the count value of the counter circuit may be compared with a fixed value to determine when the count value has reached the fixed value, thereby indicating the end of the time period. In some embodiments, the length of the time period may be 20 seconds.

While the time period is being measured out, it is determined (as indicated at 208) whether an interrogation signal is received from a POS terminal (not shown). If so, the account number for the device payment account and/or other information is sent (as indicated at 210) to the POS terminal via the antenna 106. This may be done, for example, as part of an exchange of communications between the proximity payment device 100 and the POS terminal.

After the account details or other information is sent at 210, the process loops back to decision block 202 to wait for the switch 110 to again be actuated. In other words, in the process as illustrated in FIG. 2, the proximity payment device is disabled upon sending of the account number, and remains disabled until the switch is pressed again. Thus, the proximity payment device can be read at most once, in this embodiment, after each actuation of the switch 110. However, in an alternative embodiment, the process of FIG. 2 may be modified such that the logical flow loops back from 210 to 208. In this case the proximity payment device may continue to be enabled to be read until the time period initiated at 206 comes to an end.

At 212, it is determined whether the time period has come to an end. The determination at 212 may be part of a loop with decision block 208 and may be performed before, after or essentially simultaneously with decision block 208. Until either the account number is sent or the time period expires, the loop of decision blocks 208, 212 continues. However, if it is determined at 212 that the time period has expired, then the process loops back to 202, with the proximity payment device 100 thereby becoming disabled and once again having to await actuation of the switch 110 before sending out the account number.

In some embodiments, with this arrangement of the proximity payment device, it may be operated in the following convenient manner. With the device worn on one wrist of the user, the user may actuate the switch 110 with his/her other hand. The user may then (or earlier) place the wrist with the device on it next to (or at any position that is suitable relative to) the proximity coupling device of the POS terminal to have the device read during the time period initiated by actuation of the switch.

In some embodiments, instead of or in addition to being worn on a wrist, the proximity device may be (i) worn on an arm, hand, finger, neck and/or other part of the user's body and/or (ii) carried in a hand or other part of the user's body and/or in clothing or other article worn and/or carried by the user.

In some embodiments, the switch 110 may comprise an accelerometer, a rotation sensor, a velocity sensor, a position sensor and/or other type of sensor. In some embodiments it may be possible to actuate such a switch using a part of the body on which the device is worn (and/or by which the device is carried). Thus, in some embodiments, if the device is worn on and/or carried by one wrist or hand, it may be possible to actuate the switch without the use of the other wrist or hand. This may be helpful if the other wrist or hand is holding another item and/or not free. Thus, in some embodiments, the user may actuate a switch that comprises an accelerometer, a rotation sensor, a velocity sensor, and/or a position sensor by accelerating, rotating, moving and/or positioning, respectively, a part of the body on which the device is worn (and/or by which the device is carried). The user may then place a part of the body on which the device is worn (and/or by which the device is carried) next to (or at any position that is suitable relative to) the proximity coupling device of the POS terminal to have the device read during the time period initiated by actuation of the switch. In some embodiments, a position sensor may comprise a mercury switch. In some embodiments, it may be okay to place the proximity payment device and/or a part of the body on which the device is worn (and/or by which the device is carried) next to (or at any position that is suitable relative to) the proximity coupling device of the POS terminal before, during and/or after actuating the switch 110.

Figure 3:
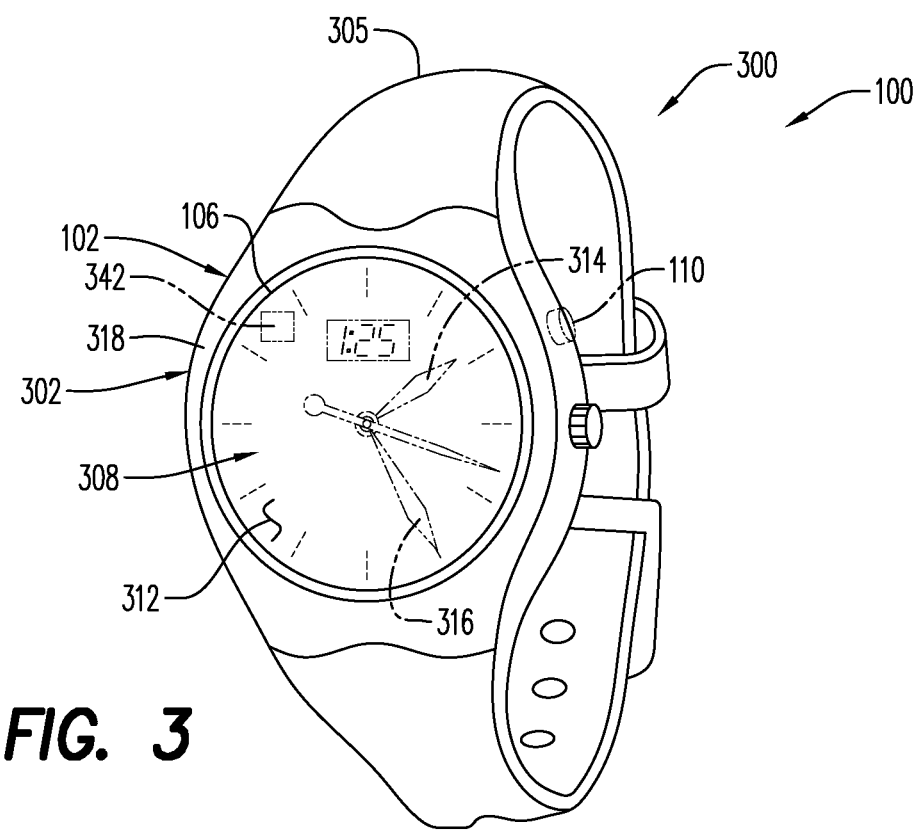
FIG. 3 is a perspective view of a proximity payment device, according to some embodiments.

FIG. 3 is a perspective view of a proximity payment device 100 that comprises a wristwatch 300, according to some embodiments. Referring to FIG. 3, the proximity payment device 100 may include a housing 102, which may define a case 302 of the wristwatch 300. The proximity payment device 100 may also include an antenna 106 and a switch 110, which may be contained in and/or supported by the case 302. The antenna 106 may be of any type and/or configuration. In some embodiments, the antenna 106 may be operative generally in accordance with the above-mentioned PayPass standard to receive interrogation and power signals (which may be the same signal) from a proximity coupling device of a POS terminal and to transmit payment card account number information and/or other information to the proximity coupling device. In some embodiments, one or more portions of the switch 110 may be disposed outside of the housing 102 and/or case 302.

The wristwatch 300 may further include a wristband 305, a display 308 and/or one or more other components (e.g., a movement (not shown), a wristwatch chip (not shown), etc.) of the wristwatch 300. The wristband 305 may be secured to the case 302. The display 308 may indicate time and may comprise an analog display and/or a digital display. An analog display may include a dial (or graduated face) 312 and one or more rotating members (or hands) 314, 316. A digital display may include a numerical display (e.g., a numeric liquid crystal display or numeric LED display).

FIG. 4 is a schematic, perspective view of a portion of the wristwatch 300, according to some embodiments, with the case 302 in an open state. Referring to FIG. 4, in accordance with some embodiments, the case 302 may include one or more portions, e.g., a front portion 318 and a back portion 320. The front portion 318 may be substantially transparent to allow the display 308 to be seen therethrough. One or more portions of the case 302 may be movable relative to one or more other portions of the case 302 to allow access to an internal chamber 321 of the wristwatch 300. For example, one side of the back portion 320 may be retained by a hinge 323 and the other side of the back portion 320 may be retained by a releasable catch 325, such that upon releasing the releasable catch, one side the back portion 320 may be free to pivot away from the rest of the case 302. The proximity payment device 300 may further include a holder 322 adapted to receive a small IC card 400.

Figure 5:
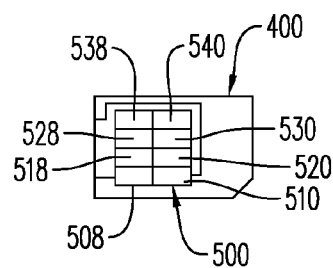
FIG. 5 is a plan view of a small IC card removed from the proximity payment device of FIG. 3, in accordance with some embodiments.

FIG. 5 is a plan view of a small IC card 400, with the small IC card 400 removed from the proximity payment device 100, in accordance with some embodiments. Referring to FIG. 5, in some embodiments, the small IC card 400 may have dimensions as defined for the standard card/module referred to as "ID000" in ISO/IEC standard 7810, promulgated by the International Standardization Organization and other bodies.

The small IC card 400 may include an RFID IC 500, which may include the data storage circuit 104 (FIG. 1) and/or the transmit/receive circuit 108 (FIG. 1). As stated above, the data storage circuit 104 may store the payment account details necessary for the communication with the POS terminal. The RFID IC 500 may include several contact pads 508-540, two of which, e.g., contact pads 508, 510, may be adapted to be electrically connected to the antenna 106. The transmit/receive circuitry 108 may couple the data storage circuit 104 to the contact pads 508, 510 of the RFID IC 500.

One or more surfaces of the small IC card 400 may carry one or more logos and/or brands, including for example the brand/logo of a national payment card association such as MasterCard International Incorporated. The brand/logo of the issuer may also be present, as well as, for example, a specific card product brand. Other features that may be present on the small IC card 400 (though such features are not shown) are an adhesive paper strip to receive the signature of the cardholder, and a security code or the like printed on the adhesive strip.

In some embodiments, a payment card account number and/or any other information (or a portion thereof) stored in the IC 500 may be printed on a surface of the small IC card 400.

In some embodiments, the small IC card 400 may comprise a small IC card that is the same as and/or similar to one or more embodiments of the small IC card disclosed in (1) U.S. patent application Ser. No. 11/852,739, entitled "IDENTIFICATION TOKEN AND METHOD OF MAKING IDENTIFICATION TOKEN", filed in the name of Simon Phillips on even date herewith, (2) U.S. patent application Ser. No. 11/852,751, entitled "IMPROVED IDENTIFICATION OF INSTALLABLE CARD", filed in the name of Simon Phillips on even date herewith, and/or (3) U.S. patent application Ser. No. 11/852,712, entitled "IDENTIFICATION TOKEN AND METHOD OF MAKING IDENTIFICATION TOKEN", filed in the name of Simon Phillips on even date herewith, the contents of each of which are hereby incorporated by reference.

In some embodiments, the small IC card 400 may comprise a small IC card fabricated using a method that is the same as and/or similar to one or more methods disclosed in (1) U.S. patent application Ser. No. 11/852,739, entitled "IDENTIFICATION TOKEN AND METHOD OF MAKING IDENTIFICATION TOKEN", filed in the name of Simon Phillips on even date herewith, (2) U.S. patent application Ser. No. 11/852,751, entitled "IMPROVED IDENTIFICATION OF INSTALLABLE CARD", filed in the name of Simon Phillips on even date herewith and/or (3) U.S. patent application Ser. No. 11/852,712, entitled "IDENTIFICATION TOKEN AND METHOD OF MAKING IDENTIFICATION TOKEN", filed in the name of Simon Phillips on even date herewith, having the contents of each of which are hereby incorporated by reference.

FIG. 6 is a schematic, partially exploded perspective view of a portion of the wristwatch 300, according to some embodiments, with the case 302 in an open state and the small IC card 400 removed.

Figure 7:
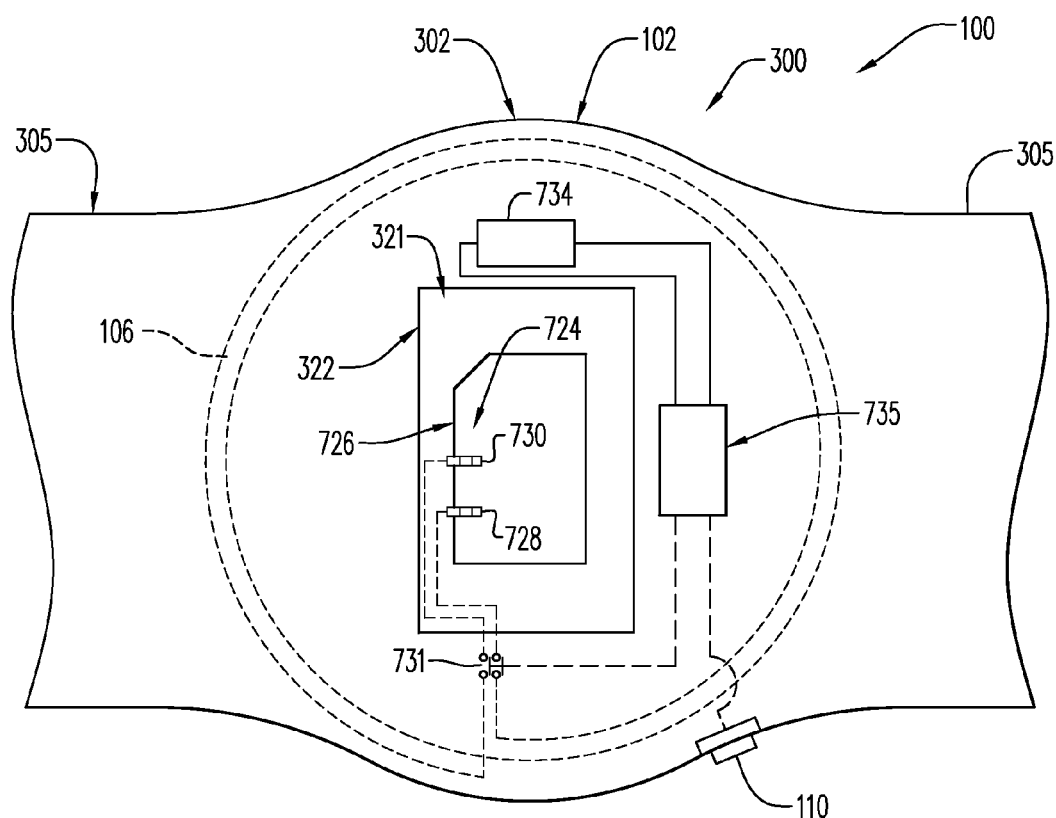
FIG. 7 is a schematic plan view of a portion of the proximity payment device of FIG. 3, according to some embodiments, with the case removed and the small IC card uninstalled.

FIG. 7 is a schematic plan view of a portion of the wristwatch 300, according to some embodiments, with the case removed and the small IC card 400 removed.

Referring to FIGS. 6-7, in accordance with some embodiments, the holder 322 may include a seat 726 adapted to receive the small IC card 400 and to support and/or position the small IC card 400 relative to an electrical interface 724, at least in part. The seat 726 may include a plurality of surfaces which may be adapted to abut surfaces of the small IC card 400 to support and/or position the small IC card 400 in the x, y and z direction, at least in part.

The electrical interface 724 may include first and second contacts 728, 730, which may be adapted to contact the contacts 508, 510, respectively, of the IC 500 of the small IC card 400. A switch 731 may be electrically connected in series between the contacts 728, 730 and the antenna 106. The switch 731 may have an open position and a closed position.

With the switch 731 in the closed position, the antenna 106 is electrically connected to the first and second contacts 728, 730 to thereby electrically connect the antenna 106 to the contacts 508, 510, respectively, of the RFID IC 500.

As stated above, the transmit/receive circuitry 108 may couple the data storage circuit 104 to the contact pads 508, 510 of the RFID IC 500. Thus, the transmit/receive circuitry 108 may be able to transmit the device payment account number and/or otherwise to interact with a POS terminal if the switch 731 is in the closed position. On the other hand, the transmit/receive circuitry 108 may be unable to transmit the device payment account number and/or otherwise to interact with a POS terminal if the switch 731 is in the open position.

Notably, the terms "open position" and "closed position" are not meant to imply that switch 731 is limited to a mechanical switch. In some embodiments, the switch 731 may comprise a transistor and/or other active device(s) and may have an "on state" and an "off state" in lieu of and/or in addition to an "open position" and "closed position".

The contacts 728, 730 may be biased (e.g., in the z direction) so as to help insure contact with respective contacts of the IC 500 of the small IC card 400. In some embodiments, each of the contacts 728, 730 may comprise a spring contact that includes a contact and a spring integral therewith to bias the spring contact (e.g., in the z direction). One or more springs 732 may be provided on the back portion 320 of the case 302 to bias the small IC card 400 toward the holder 322.

The small IC card 400 may be secured in its respective holder in any suitable manner, for example, but not limited to, mechanically (e.g., press fit, physical stops, springs).

Each portion of proximity payment device 100 may comprise any type of material(s) and may have any configuration and/or construction. Thus, for example, the case 302 may comprise any type of material(s) and may have any configuration and/or construction. In some embodiments, the case may comprise a metal, ceramic, glass, plastic, fiber, silicon, semiconductor, and/or a combination thereof. Likewise, a holder 322 and/or seat 726 may have any configuration (e.g., shape and/or size) including for example, rectangular, cylindrical, elliptical, conical, irregular and/or any combination thereof. In some embodiments, the configuration may be based on the configuration of the small IC card to be received and/or any other consideration(s) or combination thereof.

The proximity payment device 100 may further include a power source 734 and a controller 735. The power source 734 may comprise the battery 114 (FIG. 1). As stated above, the battery 114 may comprise a watch battery that supplies power to nonpayment-related components (not shown) of the watch. Although not shown, in some embodiments, the IC 500, the data storage circuit 104 (FIG. 1) and/or the transmit/receive circuit 108 (FIG. 1) may be electrically connected to and/or receive electric power from the power source 734.

The controller 735 may include the control/switch monitor circuit 112 (FIG. 1) and/or the timer circuit 116 (FIG. 1). The controller 735, the control/switch monitor circuit 112 (FIG. 1) and/or the timer circuit 116 (FIG. 1) may be electrically connected to and/or receive electric power from the power source 734. The control/switch monitor circuit 112 of the controller 735 may be electrically connected to and/or may control the switch 731 that is electrically connected in series between the contacts 738, 740 and the power source 735. The controller 735 may or may not be electrically connected to and/or control any other components (e.g., a movement (not shown) of the wristwatch 300.

In some embodiments, the wristwatch 300 may operate in accordance with the process illustrated in the flowchart of FIG. 2.

In some embodiments, the control/switch monitor circuit 112 (FIG. 1) may be operative to detect a change in state (actuation) of the switch 110. Unless the switch is actuated, the control/switch monitor circuit 112 may supply a signal that causes the switch 731 to open and/or remain in the open position. As stated above, the transmit/receive circuitry 108 may be unable to transmit the device payment account number and/or otherwise to interact with a POS terminal if the switch 731 is in the open position. The proximity payment device 100 may be considered to be disabled or not enabled so long as it is in this condition.

The proximity payment device 100 may remain in the disabled condition so long as the actuation of the switch 110 is not detected. The switch 110 may be actuated (e.g., pressed) by the user's thumb or finger to provide a signal to the control/switch monitor circuit 112. If the control/switch monitor circuit 112 determines that the switch 110 has been actuated, the control/switch monitor circuit 112 may supply a signal that causes the switch 731 to close and a time period is initiated during which the proximity payment device 100 may remain in such condition. As stated above, the transmit/receive circuitry 108 may be able to transmit the device payment account number and/or otherwise to interact with a POS terminal if the switch 731 is in the closed position. The proximity payment device 100 may be considered to be enabled so long as it is in this condition.

With the start of the time period, the timer circuit 116 may be initialized to measure out, and thereby determine a concluding end point of, the time period. While the time period is being measured out, it is determined whether an interrogation signal is received from a POS terminal (not shown). If so, the account number for the device payment account and/or other information is sent to the POS terminal via the antenna 106. In some embodiments, this may be carried out in a conventional manner. In some embodiments, the proximity payment device 100 may operate in accordance with the above-mentioned "PayPass" standard.

For example, the proximity payment device 100 may be presented to a proximity coupling device (not shown) of a POS terminal (not shown) to accomplish payment for a sales transaction. The proximity coupling device may transmit an interrogation signal. The proximity payment device 100 may receive the interrogation signal via the antenna 106. If the IC 500 does not receive any and/or all of its electric power from the power source 734, the received interrogation signal may cause the IC 500 to be powered-up. For example, the IC 500 may rectify the received interrogation signal to generate a DC power level. The IC 500 may transmit a signal to the proximity coupling device in response to the interrogation signal. The IC 500 may transmit the signal (and possibly one or more additional signals) to the proximity coupling device via the antenna 106. One or more signals transmitted by the IC 500 may include a payment card account number and/or other information required for interaction with the proximity coupling device. In some embodiments, the IC 500 may transmit the payment card account number and/or other information via the antenna 106 after a handshake procedure or the like with the POS terminal. The POS terminal may then interact with a payment card system to charge the current sales transaction to the payment card account represented by the payment card account number received from the proximity payment device 100.

In some embodiments, the control/switch monitor circuit 112 may supply a signal that causes the switch 731 to open after the account details or other information is sent at 210. In such embodiments, the control/switch monitor circuit 112 may wait for the switch 110 to again be actuated. In other words, the proximity payment device 100 may be disabled upon sending of the account number, and may remain disabled until the switch 110 is actuated again. Thus, in some embodiments, the proximity payment device 100 can be read at most once after each actuation of the switch 110.

If it is determined that the time period has expired, the control/switch monitor circuit 112 may supply a signal that causes the switch 731 to open and the control/switch monitor circuit 112 may wait for the switch 110 to again be actuated.

In some embodiments, the transmit/receive circuitry 108 may be unable to transmit the device payment account number and/or otherwise to interact with a POS terminal unless the IC 500, the data storage circuit 104 (FIG. 1) and/or the transmit/receive circuit 108 (FIG. 1) receive electrical power from the power source 734. In some such embodiments, the switch 731 may be electrically connected in series between the contacts 738, 740 and the power source 734.

In some embodiments, printed information may be provided by the proximity payment device 100. In some embodiments, printed information includes an indication of a location of a switch and/or other type of input device. Thus the indication may indicate to the cardholder (the user) where the user should press with his/her finger to actuate a switch. In some embodiments, the indication may be provided on the proximity payment device. If the device includes a case the indication may be provided on such case. If the proximity payment device includes a display, the indication may be provided on the display. In some embodiments, the indication may be provided on the small IC card 400. In some embodiments, the card may include information thereon and a back portion of the case and/or another portion of the case may be transparent and/or open to allow the information to be read.

In some embodiments, the controller 735 may (i) receive information from the small IC card 400 and/or (ii) supply information in regard to the small IC card 400. In some embodiments, one or more portions of the information supplied by the controller 735 may be supplied to the display. In some embodiments, the information supplied by the controller 735 includes one or more signals that identifies the small IC card 400, indicates whether the small IC card 400 is enabled and/or how to enable the small IC card 400. In some embodiments, such information is based at least in part on information received from the small IC card 400.

The display 708 may display information based at least in part on the information supplied thereto. Thus in some embodiments, the display may display information that identifies the small IC card 400, indicates whether the small IC card 400 is enabled and/or how to enable the small IC card 400.

In some embodiments, the display 708 may define an indicator 742. In some embodiments, the indicator 742 displays information regarding the small IC card 400. In some embodiments, the indicator may provide a visual indication that may identify the small IC card 400, indicate how to enable the small IC card 400 and/or whether the small IC card 400 is enabled. In some embodiments, a visual indication may comprise a blinking indication. In some embodiments, indicator 742 may be defined by a discrete light bulb and/or a discrete light emitting diode (LED) rather than by display device 708.

In some embodiments, the information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the small IC card 400 and/or (iii) a brand and/or logo of a specific card product. In some embodiments, a brand and/or logo may comprise a mark that is registered in one or more country or jurisdiction and/or protected under trademark law in one or more country or jurisdiction.

In some embodiments, one or more portions of the information supplied to and/or by the display may comprise one or more bit map. In some embodiments, a bit map identifies the small IC card 400. In some embodiments, a bit map defines one or more logos and/or brands. In some embodiments, a bit map supplied by the controller is based at least in part on a bit map received from the small IC card 400.

In some embodiments, indicator 742 may comprise audio indicators and/or vibratory indicators in addition to and/or in lieu of indicators that provide visible indication. An audio indicator may provide an audible indication and/or a beeping audible indication. A vibratory indicator may provide a vibratory indication. In some embodiments, the indication may identify the small IC card 400, indicate how to enable the small IC card 400 and/or whether the small IC card 400 is enabled.

In some embodiments, a wristwatch 300 and/or other type of proximity payment device 100 may be adapted to receive more than one small IC card 400. In some embodiments, a wristwatch 300 and/or other type of proximity payment device 100 may be the same as and/or similar to one or more embodiments of a wristwatch and/or other type of proximity payment device disclosed in U.S. patent application Ser. No. 11/852,712, entitled "IDENTIFICATION TOKEN AND METHOD OF MAKING IDENTIFICATION TOKEN", filed in the name of Simon Phillips on even date herewith, the contents of which are hereby incorporated by reference.

Figure 8A:
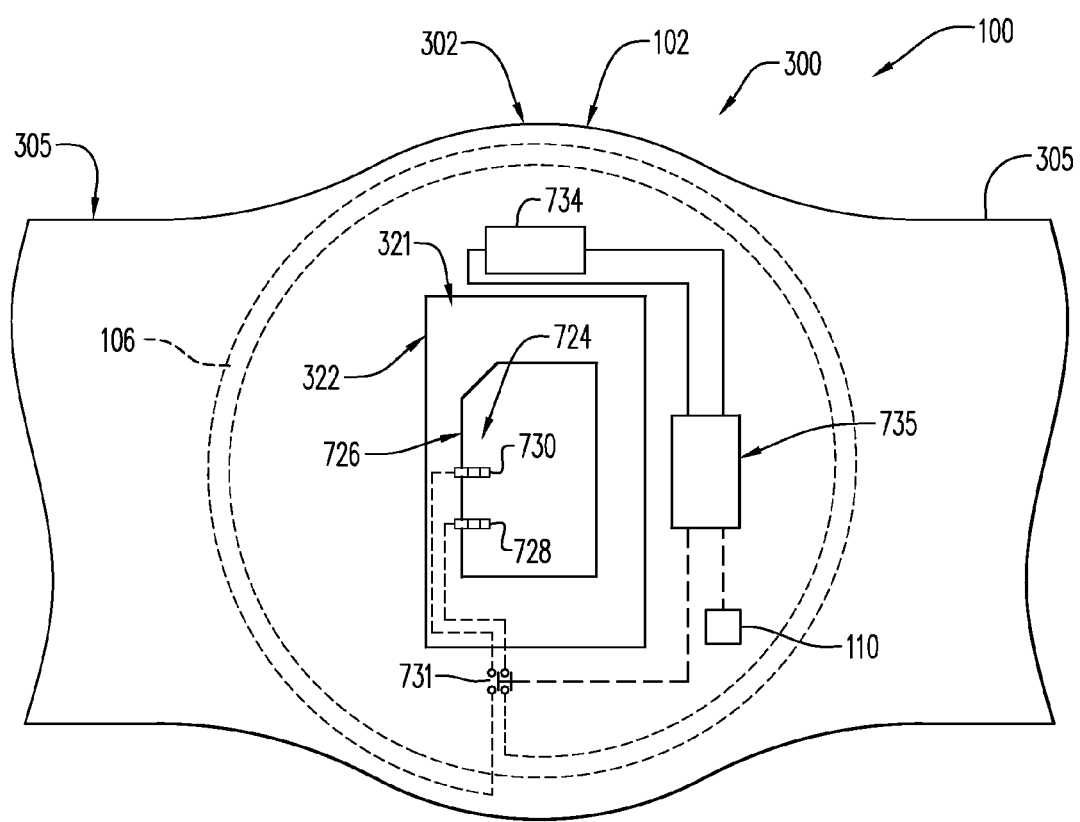
FIG. 8A is a schematic plan view of a portion of the proximity payment device of FIG. 3, according to some embodiments, with the case removed and the small IC card uninstalled.

FIG. 8A is a schematic plan view of a portion of the wristwatch 300, according to some embodiments, with the case removed and the small IC card 400 uninstalled. Referring to FIG. 8A, in some embodiments, the switch 110 may comprise an accelerometer, a rotation sensor, a velocity sensor, a position sensor and/or other type of sensor. In some embodiments, the switch 110 may be disposed entirely within the housing 102 and/or case 302. This may help protect the switch 110 from damage.

Figure 8B:
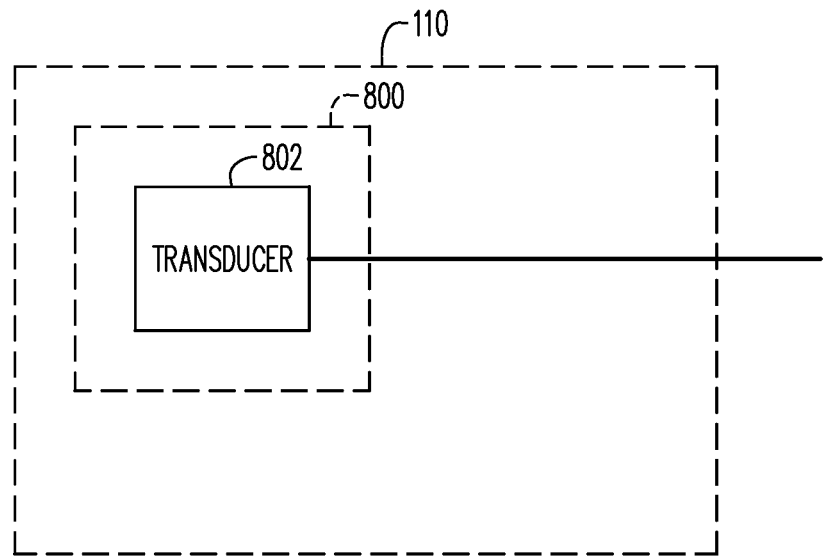
FIG. 8B is a schematic block diagram of a switch, in accordance with some embodiments.

FIG. 8B is a schematic block diagram of a switch 110 that comprises an accelerometer, a rotation sensor, a velocity sensor, a position sensor and/or other type of sensor, in accordance with some embodiments. Referring to FIG. 8B, in some embodiments, the switch 110 may comprise a sensor 800 that includes a transducer 802. The transducer 802 may convert energy from one form to another. If the sensor 800 comprises an accelerometer, the transducer 802 may convert acceleration, shock and/or vibration energy to an electrical signal.

The signal from the transducer may be supplied to the control/switch monitor circuit 112, which may determine, based at least in part on such signal, whether the switch 110 has been actuated.

The user may actuate the switch 110 by providing appropriate movement. In some embodiments, the user may actuate a switch 110 that comprises an accelerometer, a rotation sensor, a velocity sensor, and/or a position sensor by accelerating, rotating, moving and/or positioning, respectively, a part of the body on which the proximity payment device 100 is worn (and/or by which the proximity payment device 100 is carried).

If the movement is a type to which the transducer 802 is responsive, the transducer 802 may supply a signal based at least in part thereon. The signal from the transducer may be supplied to the control/switch monitor circuit 112, which may determine, based at least in part on such signal, whether the switch 110 has been actuated.

The user may then place a part of the body on which the device is worn (and/or by which the device is carried) next to (or at any position that is suitable relative to) the proximity coupling device of the POS terminal to have the device read during the time period initiated by actuation of the switch.

In some embodiments, the switch may not be actuated unless the movement has a magnitude that exceeds a reference magnitude. Thus, if the switch 110 comprises an accelerometer, the switch 110 may not be actuated unless the user provides an acceleration having a magnitude that exceeds a reference magnitude.

In some embodiments, the transducer 802 may not be responsive to movement unless the reference magnitude is exceeded. In some embodiments, the reference magnitude may comprise a fixed reference magnitude. In some other embodiments, the reference magnitude may comprise an adaptively determined reference magnitude. In some embodiments, the reference magnitude may be chosen to help minimize and/or eliminated unintended actuation of the switch.

In some embodiments, except for actuation of the switch 110, the operation of the embodiments of the wristwatch 300 illustrated in FIGS. 8A-8B may be the same as and/or similar to the operation of the wristwatch illustrated in FIGS. 6-7.

Figure 8C:
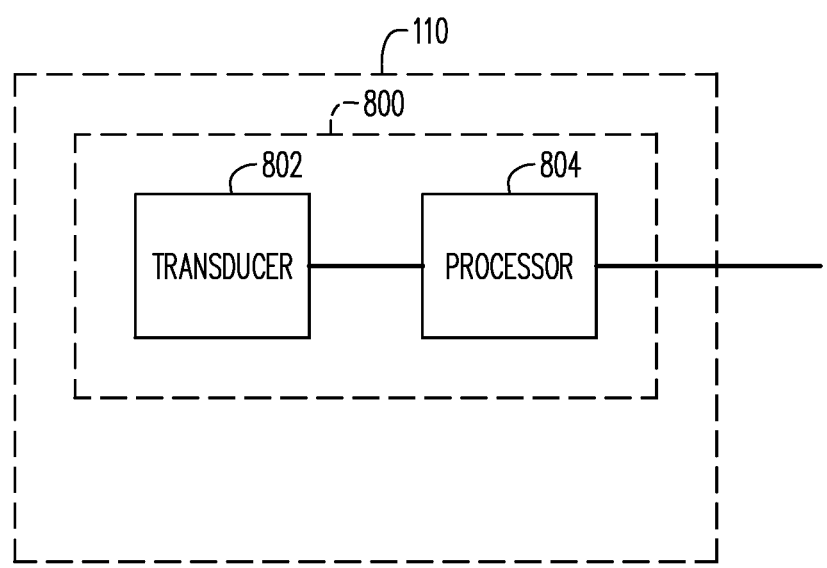
FIG. 8C is a schematic block diagram of a switch, in accordance with some embodiments.

FIG. 8C is a schematic block diagram of a switch 110 that comprises an accelerometer, a rotation sensor, a velocity sensor, a position sensor and/or other type of sensor, in accordance with some embodiments. Referring to FIG. 8C, in some embodiments, the switch 110 may comprise a sensor 800 that includes a transducer 802 and a processor 804. The transducer 802 may convert energy from one form to another.

The signal from the transducer 802 may be supplied to the processor 804, which may determine, based at least in part on such signal, whether the switch 110 has been actuated. The processor 804 may in turn supply a signal indicating whether the switch has been actuated. Such signal from the processor 804 may be supplied to the control/switch monitor circuit 112.

As used herein, a processor may be any type of processor. For example, a processor may be programmable or non programmable, general purpose or special purpose, dedicated or non dedicated, distributed or non distributed, shared or not shared, and/or any combination thereof. If the processor has two or more distributed portions, the two or more portions may communicate with one another through a communication link. A processor may include, for example, but is not limited to, hardware, software, firmware, hardwired circuits and/or any combination thereof.

A communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

The user may actuate the switch 110 by providing appropriate movement. In some embodiments, the user may actuate a switch 110 that comprises an accelerometer, a rotation sensor, a velocity sensor, and/or a position sensor by accelerating, rotating, moving and/or positioning, respectively, a part of the body on which the proximity payment device 100 is worn (and/or by which the proximity payment device 100 is carried).

If the movement is a type to which the transducer 802 is responsive, the transducer 802 may supply a signal based at least in part thereon. The signal from the transducer may be supplied to the control/switch monitor circuit 112, which may determine, based at least in part on such signal, whether the switch 110 has been actuated.

The user may then place a part of the body on which the device is worn (and/or by which the device is carried) next to (or at any position that is suitable relative to) the proximity coupling device of the POS terminal to have the device read during the time period initiated by actuation of the switch.

In some embodiments, the switch 110 may not be actuated unless the movement has a magnitude that exceeds a reference magnitude. Thus, if the switch 110 comprises an accelerometer, the switch 110 may not be actuated unless the user provides an acceleration having a magnitude that exceeds a reference magnitude.

In some embodiments, the processor 804 determines whether the reference magnitude has been exceeded. The signal supplied by the processor 84 may be based at least in part on such determination.

In some embodiments, the reference magnitude may comprise a fixed reference magnitude. In some other embodiments, the reference magnitude may comprise an adaptively determined reference magnitude. In some embodiments, the reference magnitude may be chosen to help minimize and/or eliminated unintended actuation of the switch.

In some embodiments, the sensor 800 may comprise a light sensor, acoustic sensor and or other type of sensor and may be actuated by light, sound and/or another type of energy. In some embodiments, the switch may be actuated in response to speech that includes a password. In some embodiments, the switch may be actuated in response to one or more types of biometric authentication data associated by the user. In some embodiments, the one or more types of biometric authentication data may comprise an image of one or more parts of the user, speech of the user and/or a fingerprint of the user. In some embodiments, the image may be an image of a face (or portion thereof) of the user and/or a fingerprint (or portion thereof) of the user.

Some embodiments may use one or more of the techniques disclosed in U.S. patent application Ser. No. 11/852,804, entitled "METHOD FOR USE IN ASSOCIATION WITH IDENTIFICATION TOKEN AND APPARATUS INCLUDING IDENTIFICATION TOKEN", filed in the name of Simon Phillips et al. on even date herewith, the contents of which are hereby incorporated by reference.

In some embodiments, a switch may be the same as and/or similar to one or more embodiments of a switch disclosed in (1) U.S. patent application Ser. No. 11/503,197, entitled "PROXIMITY PAYMENT CARD WITH USER-ACTUATED SWITCH AND METHODS OF MAKING THE CARD", filed in the name of Colin Tanner on Aug. 11, 2006, (2) U.S. patent application Ser. No. 11/517,072, entitled "PROXIMITY PAYMENT CARD WITH COST-EFFECTIVE CONNECTION BETWEEN USER-ACTUATABLE INPUT SWITCH AND RFID IC", filed in the name of Colin Tanner on Sep. 7, 2006 and/or (3) U.S. patent application Ser. No. 11/702,714, entitled "METHOD AND APPARATUS FOR PERSONALIZING CONTACTLESS CARD WITH SWITCH", filed in the name of Simon Phillips on Feb. 6, 2007, the contents of which are hereby incorporated by reference.

In some embodiments, except for actuation of the switch 110, the operation of the embodiments of the wristwatch 300 illustrated in FIGS. 8A and 8C may be the same as and/or similar to the operation of the wristwatch illustrated in FIGS. 6-7.

Figure 9:
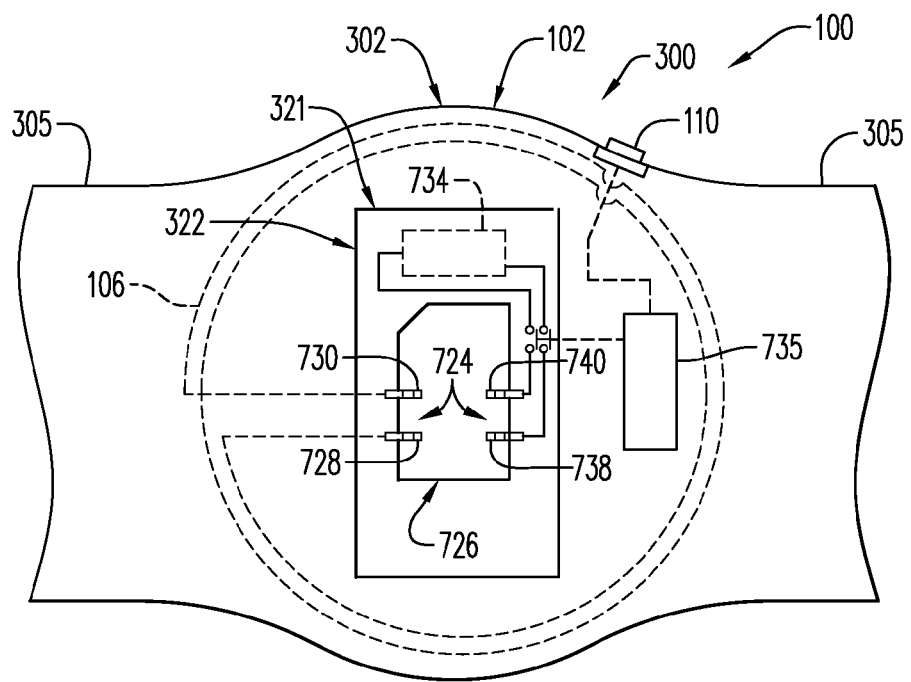
FIG. 9 is a schematic plan view of a portion of the proximity payment device of FIG. 3, according to some embodiments, with the case removed and the small IC card uninstalled.

FIG. 9 is a schematic plan view of a portion of the wristwatch 300, according to some embodiments, with the case removed and the small IC card 400 uninstalled. Referring to FIG. 9, as stated above, in some embodiments, the transmit/receive circuitry 108 may be unable to transmit the device payment account number and/or otherwise to interact with a POS terminal unless the IC 500, the data storage circuit 104 (FIG. 1) and/or the transmit/receive circuit 108 (FIG. 1) receive electrical power from the power source 734.

In that regard, the IC 500 may include one or more contacts, e.g., contacts 738, 740, adapted to be electrically connected to and/or receive electrical power from the power source 734. The electrical interface 724 may include third and fourth contacts 738, 740, which may be adapted to contact the contacts 518, 520, respectively, of the IC 500 of the small IC card 400. A switch 731 may be electrically connected in series between the contacts 738, 740 and the power source 734. The switch 731 may have an open position and a closed position. With the switch 731 in the closed position, the power source 734 is electrically connected to the third and fourth contacts 738, 740 to thereby electrically connect the power source to the contacts 518, 520, respectively, of the RFID IC 500.

Thus, the transmit/receive circuitry 108 may be able to transmit the device payment account number and/or otherwise to interact with a POS terminal if the switch 731 is in the closed position. On the other hand, the transmit/receive circuitry 108 may be unable to transmit the device payment account number and/or otherwise to interact with a POS terminal if the switch 731 is in the open position.

The contacts 738, 740 may be biased (e.g., in the z direction) so as to help insure contact with respective contacts of the IC 500 of the small IC card 400. In some embodiments, each of the contacts 738, 740 may comprise a spring contact that includes a contact and a spring integral therewith to bias the spring contact (e.g., in the z direction).

The control/switch monitor circuit 112 of the controller 735 may be electrically connected to and/or may control the switch 731 that is electrically connected in series between the contacts 738, 740 and the power source 735.

In some embodiments, the wristwatch 300 may operate in accordance with the process illustrated in the flowchart of FIG. 2.

In some embodiments, the control/switch monitor circuit 112 (FIG. 1) may be operative to detect a change in state (actuation) of the switch 110. Unless the switch is actuated, the control/switch monitor circuit 112 may supply a signal that causes the switch 731 to open and/or remain in the open position. As stated above, the transmit/receive circuitry 108 may be unable to transmit the device payment account number and/or otherwise to interact with a POS terminal if the switch 731 is in the open position. The proximity payment device 100 may be considered to be disabled or not enabled so long as it is in this condition.

The proximity payment device 100 may remain in the disabled condition so long as the actuation of the switch 110 is not detected. The switch 110 may be actuated (e.g., pressed) by the user's thumb or finger to provide a signal to the control/switch monitor circuit 112. If the control/switch monitor circuit 112 determines that the switch 110 has been actuated, the control/switch monitor circuit 112 may supply a signal that causes the switch 731 to close and a time period is initiated during which the proximity payment device 100 may remain in such condition. As stated above, the transmit/receive circuitry 108 may be able to transmit the device payment account number and/or otherwise to interact with a POS terminal if the switch 731 is in the closed position. The proximity payment device 100 may be considered to be enabled so long as it is in this condition.

With the start of the time period, the timer circuit 116 may be initialized to measure out, and thereby determine a concluding end point of, the time period. While the time period is being measured out, it is determined whether an interrogation signal is received from a POS terminal (not shown). If so, the account number for the device payment account and/or other information is sent to the POS terminal via the antenna 106. In some embodiments, this may be carried out in a conventional manner. In some embodiments, the proximity payment device 100 may operate in accordance with the above-mentioned "PayPass" standard.

In some embodiments, the control/switch monitor circuit 112 may supply a signal that causes the switch 731 to open after the account details or other information is sent at 210. In such embodiments, the control/switch monitor circuit 112 may wait for the switch 110 to again be actuated. In other words, the proximity payment device 100 may be disabled upon sending of the account number, and may remain disabled until the switch 110 is actuated again. Thus, in some embodiments, the proximity payment device 100 can be read at most once after each actuation of the switch 110.

If it is determined that the time period has expired, the control/switch monitor circuit 112 may supply a signal that causes the switch 731 to open and the control/switch monitor circuit 112 may wait for the switch 110 to again be actuated.

In some embodiments, the RFID IC 500 may further include the control/switch monitor circuit 112 (FIG. 1), the timer circuit 116 (FIG. 1) and the switch 731. The switch 731 may be electrically connected in series between the antenna 106 and the transmit/receive circuitry 108 and/or in series between the power source 734 and the control/switch monitor circuit 112 (FIG. 1) and/or the timer circuit 116 (FIG. 1). Thus, in the RFID IC 500, the switch 731 may carry out a function that is the same as and/or similar to the function of the switch 731 illustrated in FIG. 7 and/or the function of the switch 731 illustrated in FIG. 9.

Figure 10:
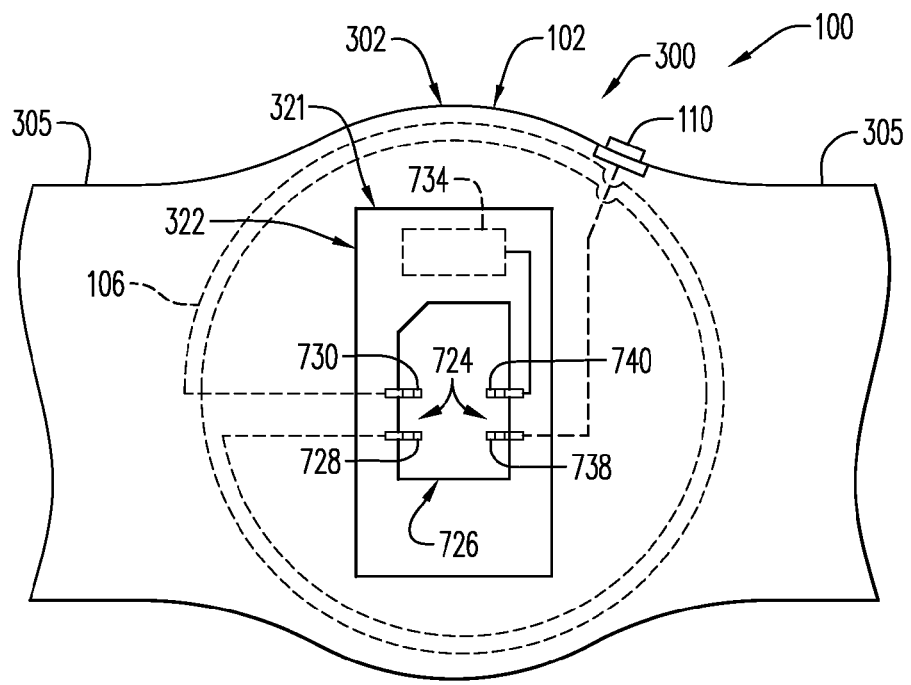
FIG. 10 is a schematic plan view of a portion of the proximity payment device of FIG. 3, according to some embodiments, with the case removed and the small IC card uninstalled.

FIG. 10 is a schematic plan view of a portion of the wristwatch 300, according to some embodiments, with the case removed and the small IC card 400 uninstalled. Referring to FIG. 10, as stated above, in some embodiments, the RFID IC 500 may further include the control/switch monitor circuit 112 (FIG. 1), the timer circuit 116 (FIG. 1) and the switch 731. The switch 731 may be electrically connected in series between the antenna 106 and the transmit/receive circuitry 108 and/or in series between the power source 734 and the control/switch monitor circuit 112 (FIG. 1) and/or the timer circuit 116 (FIG. 1). Thus, in the RFID IC 500, the switch 731 may carry out a function that is the same as and/or similar to the function of the switch 731 illustrated in FIG. 7 and/or the function of the switch 731 illustrated in FIG. 9.

The transmit/receive circuitry 108 may be able to transmit the device payment account number and/or otherwise to interact with a POS terminal if the switch 731 is in the closed position. On the other hand, the transmit/receive circuitry 108 may be unable to transmit the device payment account number and/or otherwise to interact with a POS terminal if the switch 731 is in the open position.

The control/switch monitor circuit 112 of the RFID IC 500 may be electrically connected to and/or may control the switch 731.

It should be noted that although only one electrical connection is shown between the RFID IC 500 and the power source 734, some embodiments may include more than one electrical connection between the RFID IC 500 and the power source 734.

In some embodiments, the wristwatch 300 may operate in accordance with the process illustrated in the flowchart of FIG. 2.

In some embodiments, the control/switch monitor circuit 112 (FIG. 1) may be operative to detect a change in state (actuation) of the switch 110. Unless the switch 110 is actuated, the control/switch monitor circuit 112 may supply a signal that causes the switch 731 to open and/or remain in the open position. As stated above, the transmit/receive circuitry 108 may be unable to transmit the device payment account number and/or otherwise to interact with a POS terminal if the switch 731 is in the open position. The proximity payment device 100 may be considered to be disabled or not enabled so long as it is in this condition.

The proximity payment device 100 may remain in the disabled condition so long as the actuation of the switch 110 is not detected. The switch 110 may be actuated (e.g., pressed) by the user's thumb or finger to provide a signal to the control/switch monitor circuit 112. If the control/switch monitor circuit 112 determines that the switch 110 has been actuated, the control/switch monitor circuit 112 may supply a signal that causes the switch 731 to close and a time period is initiated during which the proximity payment device 100 may remain in such condition. As stated above, the transmit/receive circuitry 108 may be able to transmit the device payment account number and/or otherwise to interact with a POS terminal if the switch 731 is in the closed position. The proximity payment device 100 may be considered to be enabled so long as it is in this condition.

With the start of the time period, the timer circuit 116 may be initialized to measure out, and thereby determine a concluding end point of, the time period. While the time period is being measured out, it is determined whether an interrogation signal is received from a POS terminal (not shown). If so, the account number for the device payment account and/or other information is sent to the POS terminal via the antenna 106. In some embodiments, this may be carried out in a conventional manner. In some embodiments, the proximity payment device 100 may operate in accordance with the above-mentioned "PayPass" standard.

In some embodiments, the control/switch monitor circuit 112 may supply a signal that causes the switch 731 to open after the account details or other information is sent at 210. In such embodiments, the control/switch monitor circuit 112 may wait for the switch 110 to again be actuated. In other words, the proximity payment device 100 may be disabled upon sending of the account number, and may remain disabled until the switch 110 is actuated again. Thus, in some embodiments, the proximity payment device 100 can be read at most once after each actuation of the switch 110.

If it is determined that the time period has expired, the control/switch monitor circuit 112 may supply a signal that causes the switch 731 to open and the control/switch monitor circuit 112 may wait for the switch 110 to again be actuated.

As stated above, in some embodiments, the timer circuit 116 may be omitted, in favor of the switch 110 being of a type that mechanically retains an actuated state for a predetermined period of time and then changes back to an unactuated state upon expiration of the period of time.

Figure 11:
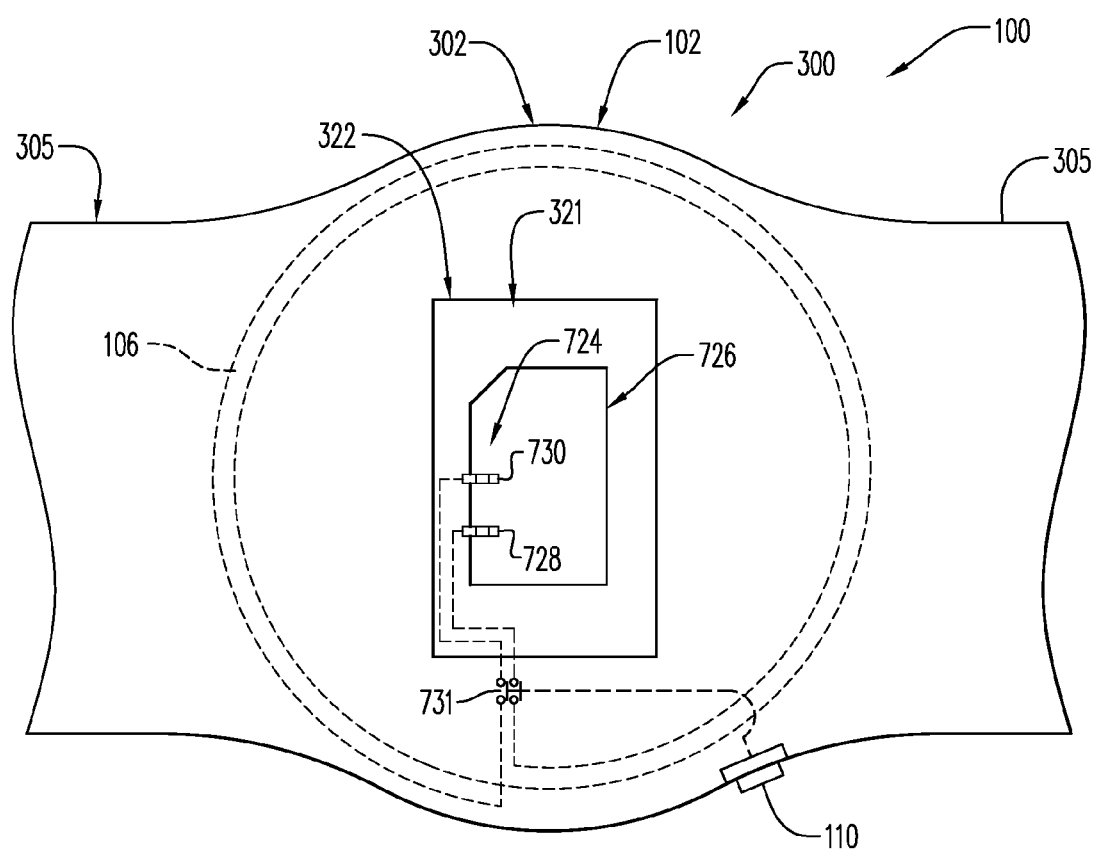
FIG. 11 is a schematic plan view of a portion of the proximity payment device of FIG. 3, according to some embodiments, with the case removed and the small IC card uninstalled.

FIG. 11 is a schematic plan view of a portion of the wristwatch 300, according to some embodiments, with the case removed and the small IC card 400 uninstalled. Referring to FIG. 11, as stated above, in some embodiments, the switch 110 may comprise a type that mechanically retains an actuated state for a predetermined period of time and then changes back to an unactuated state upon expiration of the period of time.

With such a switch, the control/switch monitor circuit 112 may be configured to read the present state of the switch 110, but need not do so except when the proximity payment device is being interrogated. In some embodiments, the power for the control/switch monitor circuit accordingly may come from the interrogation signal.

The RFID IC 500 may be similar to RFID IC 500 of FIG. 10. In that regard, the RFID IC 500 may include the control/switch monitor circuit 112 (FIG. 1), the timer circuit 116 (FIG. 1) and the switch 731. The switch 731 may be electrically connected in series between the antenna 106 and the transmit/receive circuitry 108 and/or in series between the power source 734 and the control/switch monitor circuit 112 (FIG. 1) and/or the timer circuit 116 (FIG. 1). Thus, in the RFID IC 500, the switch 731 may carry out a function that is the same as and/or similar to the function of the switch 731 illustrated in FIG. 7 and/or the function of the switch 731 illustrated in FIG. 9.

The transmit/receive circuitry 108 may be able to transmit the device payment account number and/or otherwise to interact with a POS terminal if the switch 731 is in the closed position. On the other hand, the transmit/receive circuitry 108 may be unable to transmit the device payment account number and/or otherwise to interact with a POS terminal if the switch 731 is in the open position.

The control/switch monitor circuit 112 of the RFID IC 500 may be electrically connected to and/or may control the switch 731.

It should be noted that some embodiments may further include a power source 734 and one or more electrical connection between the RFID IC 500 and the power source 734.

In some embodiments, the wristwatch 300 may operate in accordance with the process illustrated in the flowchart of FIG. 2.

In some embodiments, the control/switch monitor circuit 112 (FIG. 1) may be operative to detect a change in state (actuation) of the switch 110. Unless the switch is actuated, the control/switch monitor circuit 112 may supply a signal that causes the switch 731 to open and/or remain in the open position. As stated above, the transmit/receive circuitry 108 may be unable to transmit the device payment account number and/or otherwise to interact with a POS terminal if the switch 731 is in the open position. The proximity payment device 100 may be considered to be disabled or not enabled so long as it is in this condition.

The proximity payment device 100 may remain in the disabled condition so long as the actuation of the switch 110 is not detected. The switch 110 may be actuated (e.g., pressed) by the user's thumb or finger to provide a signal to the control/switch monitor circuit 112. If the control/switch monitor circuit 112 determines that the switch 110 has been actuated, the control/switch monitor circuit 112 may supply a signal that causes the switch 731 to close. As stated above, the transmit/receive circuitry 108 may be able to transmit the device payment account number and/or otherwise to interact with a POS terminal if the switch 731 is in the closed position. The proximity payment device 100 may be considered to be enabled so long as it is in this condition.

The control/switch monitor circuit 112 may be configured to read the present state of the switch 110. While the switch 110 is in the actuated state, it is determined whether an interrogation signal is received from a POS terminal (not shown). If so, the account number for the device payment account and/or other information is sent to the POS terminal via the antenna 106. In some embodiments, this may be carried out in a conventional manner. In some embodiments, the proximity payment device 100 may operate in accordance with the above-mentioned "PayPass" standard.

In some embodiments, the control/switch monitor circuit 112 may supply a signal that causes the switch 731 to open after the account details or other information is sent at 210. In such embodiments, the control/switch monitor circuit 112 may wait for the switch 110 to again be actuated. In other words, the proximity payment device 100 may be disabled upon sending of the account number, and may remain disabled until the switch 110 is actuated again. Thus, in some embodiments, the proximity payment device 100 can be read at most once after each actuation of the switch 110.

If it is determined that the switch 110 is unactuated, the period of time has expired and the control/switch monitor circuit 112 may supply a signal that causes the switch 731 to open and the control/switch monitor circuit 112 may wait for the switch 110 to again be actuated.

Figure 12:
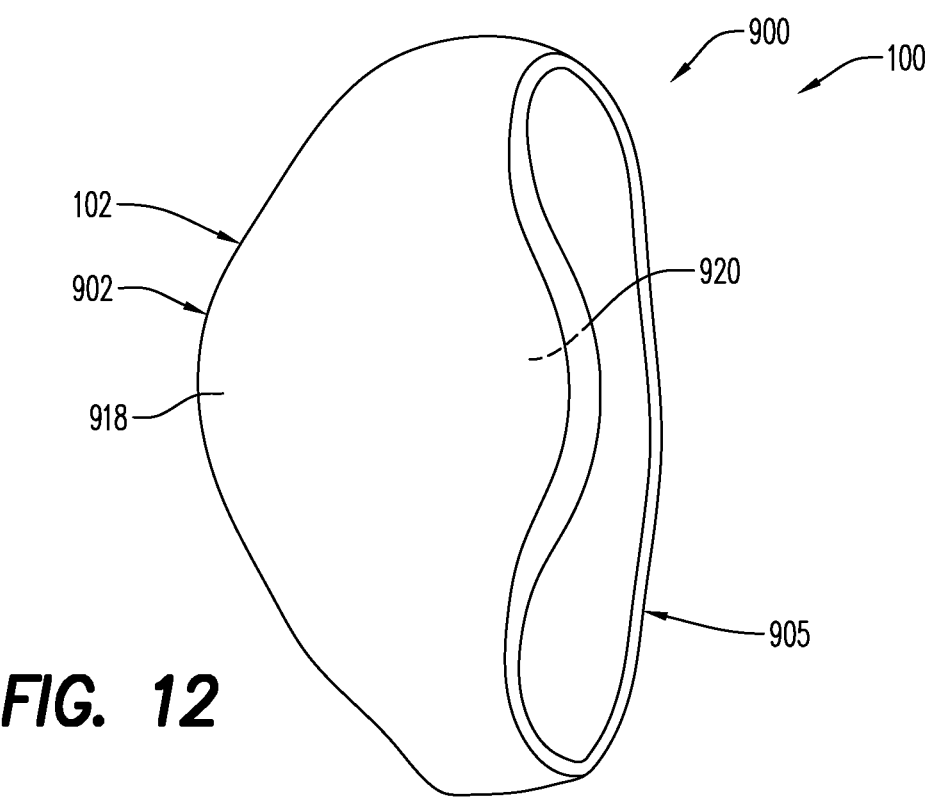
FIG. 12 is a perspective view of a proximity payment device, according to some embodiments.

FIG. 12 is a perspective view of a proximity payment device 100 that comprises a wristband 900, according to some embodiments. Referring to FIG. 12, the wristband 900 may include a housing 102, which may define a case 902 and/or plastic body of the wristband 900. The wristband 900 may further include a band 905 and/or one or more other components (not shown). The band 905 may be secured to the case 902. The case 902 may include one or more portions, e.g., a front portion 918 and a back portion 920. One or more portions of the case 902 may be movable relative to one or more other portions of the case 902 to allow access to an internal chamber of the wristband.

In some embodiments, the wristband 900 may further comprise additional components that are the same as and/or similar to components of one or more embodiments of the proximity payment device 100 described herein, such that the wristband 900 may operate in a manner that is the same as and/or similar to the manner of operation of one or more embodiments of the proximity payment device 100 described herein.

Figure 13:
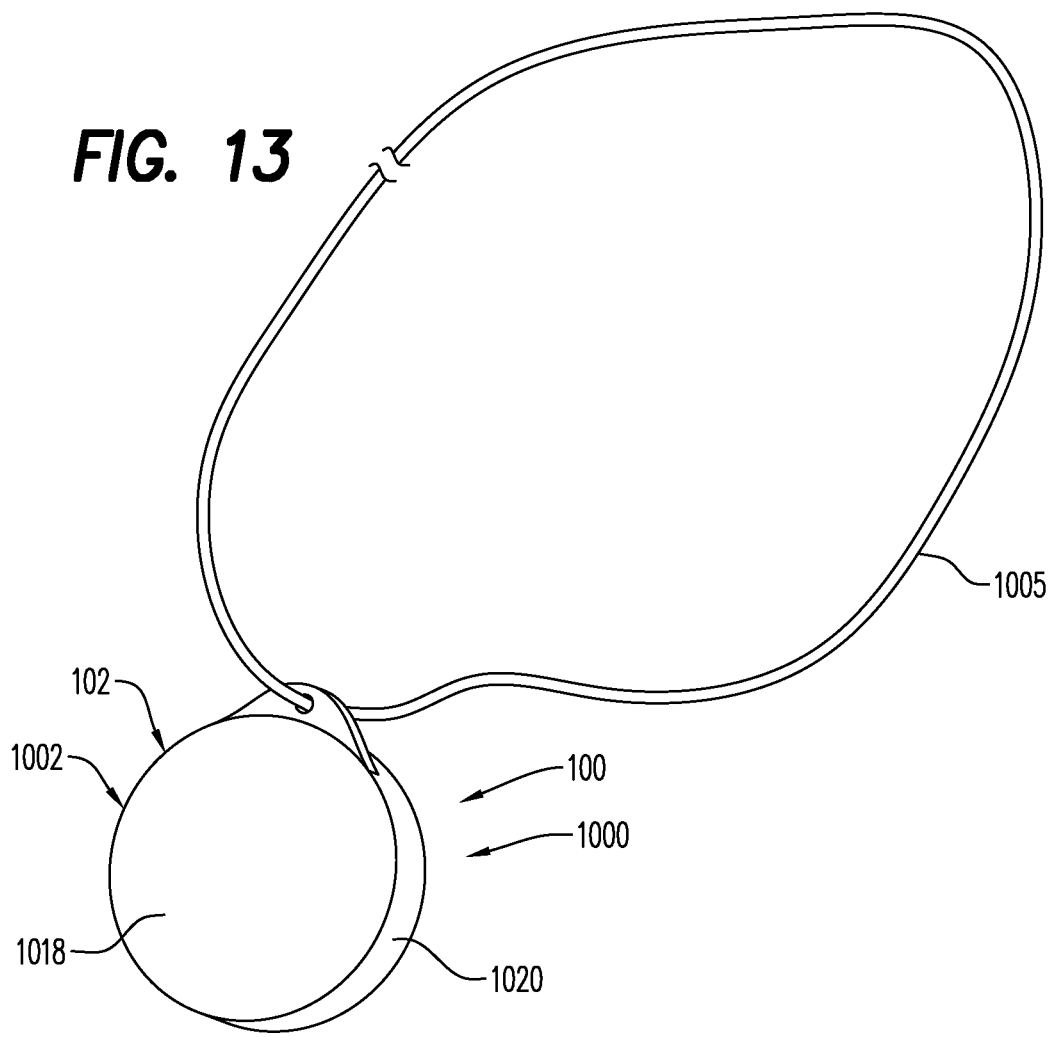
FIG. 13 is a perspective view of a proximity payment device, according to some embodiments.

FIG. 13 is a perspective view of a proximity payment device 100 that comprises a pendant 1000, according to some embodiments. Referring to FIG. 13, the pendant 1000 may include a housing 102, which may define a case 1002 and/or plastic body of the pendant 1000. The pendant 1000 may further include a band 1005 and/or one or more other components (not shown). The band 1005 may be secured to the case 1002. The case 1002 may include one or more portions, e.g., a front portion 1018 and a back portion 1020. One or more portions of the case 1002 may be movable relative to one or more other portions of the case 1002 to allow access to an internal chamber of the pendant.

In some embodiments, the pendant 1000 may further comprise additional components that are the same as and/or similar to components of one or more embodiments of the proximity payment device 100 described herein such that the pendant 1000 may operate in a manner that is the same as and/or similar to the manner of operation of one or more embodiments of the proximity payment device 100 described herein.

Notably, the switch 110 is not limited to the types of switches that disclosed herein or to switches that are actuated by methods disclosed herein.

Figure 14:
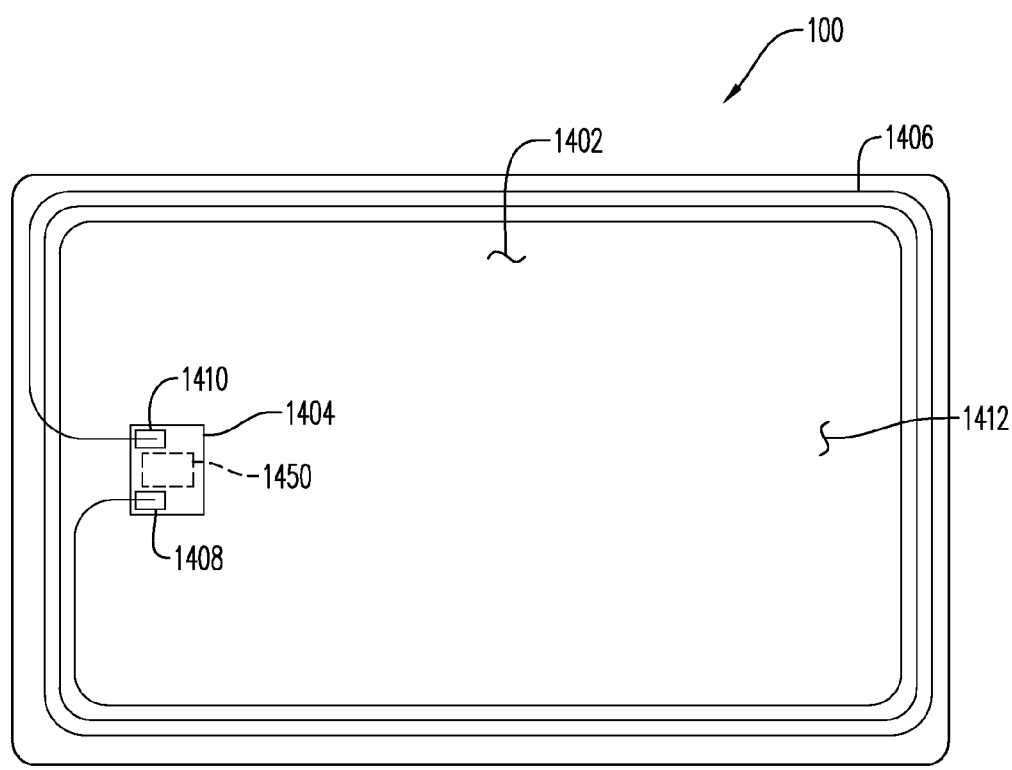
FIG. 14 is a schematic plan view of a proximity payment device, according to some embodiments.

FIG. 14 is a schematic plan view of a proximity payment device 100, according to some embodiments.

Figure 15:
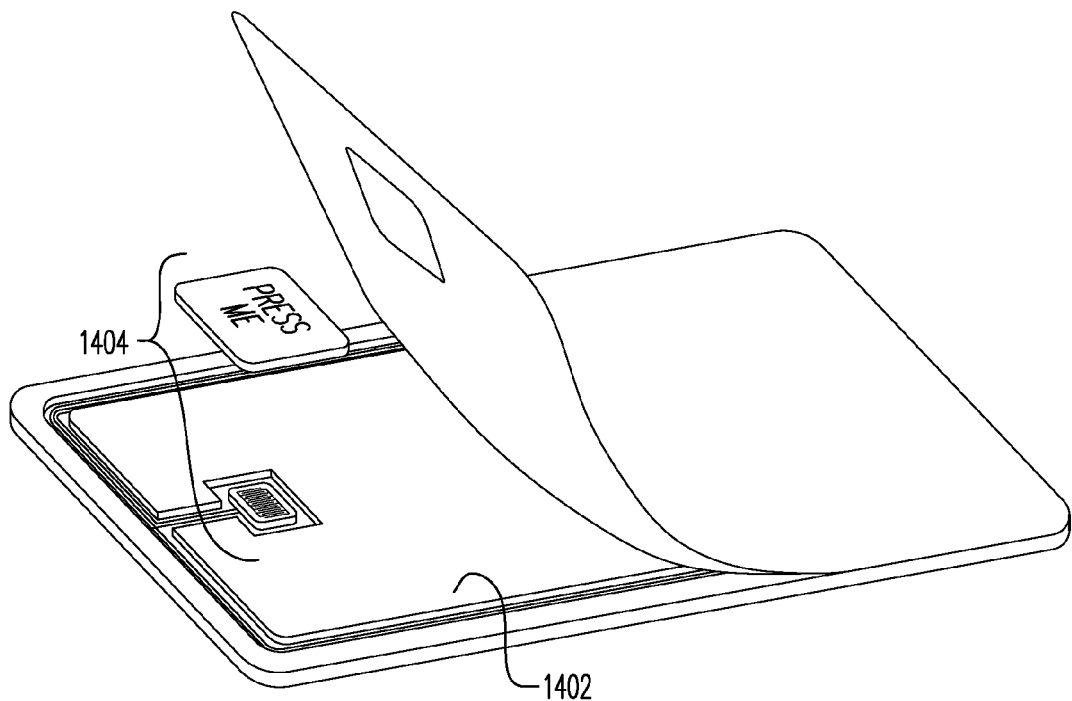
FIG. 15 is a perspective view of the proximity payment device of FIG. 14, in a partially assembled state, according to some embodiments.

FIG. 15 is a perspective view of the proximity payment device of FIG. 14, in a partially assembled state, according to some embodiments.

Referring to FIGS. 14-15, the proximity payment device 100 may include a card-shaped body 1402, which may resemble conventional payment cards in shape and size. The card-shaped body 1402 may be formed of plastic or another suitable material.

The proximity payment card 100 may also include an RFID module 1404. The RFID module 1404 may be mounted and/or installed in any suitable manner in the card-shaped body 1402. The RFID module 1404, which will be described in further detail below, may be suitably designed and configured to transmit payment card account information by radio frequency signaling to a POS terminal. In general, the RFID module 1404 may be designed and configured to operate in accordance with the "PayPass" standard promulgated by MasterCard International Incorporated, the assignee hereof.

The proximity payment card 100 may further include an antenna 1406 embedded or otherwise mounted on the card-shaped body 1402. As shown, the antenna 1406 may be in the form of several loops arranged along the periphery of the card-shaped body. Alternatively, the antenna 1406 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

The RFID module 1404 may include electrically conductive contact pads 1408, 1410, by which the RFID module 1404 is electrically conductively connected to the antenna 1406. In some embodiments, the RFID module 1404 may include an RFID IC 1450. In some embodiments, the RFID IC 1450 may be the same as and/or similar to one or more embodiments of the RFID IC 500 disclosed herein.

In some embodiments, one or more portions of the proximity payment device 100 may be the same as and/or similar to one or more portions of one or more embodiments of the proximity payment card disclosed in U.S. patent application Ser. No. 11/503,197, entitled "PROXIMITY PAYMENT CARD WITH USER-ACTUATED SWITCH AND METHODS OF MAKING THE CARD", filed in the name of Colin Tanner on Aug. 11, 2006, the contents of which are hereby incorporated by reference.

In some embodiments, the RFID module 1404 may comprise one or more of the data storage circuit 104 (FIG. 1), transmit/receive circuitry 108 (FIG. 1), switch 110 (FIG. 1) and control/switch monitor circuit 112 (FIG. 1), battery 114 (FIG. 1) and/or timer circuit 116 (FIG. 1) such that the proximity payment device may operate in a manner that is the same as and/or similar to the manner of operation of one or more embodiments of the proximity payment device 100 described herein. In some embodiments, the switch 100 may be actuated by pressing on the RFID module 1404.

In some embodiments, the RFID module 1404 includes an RFID IC 1450 that includes one or more of the data storage circuit 104 (FIG. 1), transmit/receive circuitry 108 (FIG. 1), switch 110 (FIG. 1) and control/switch monitor circuit 112 (FIG. 1), battery 114 (FIG. 1) and/or timer circuit 116 (FIG. 1) such that the proximity payment device may operate in a manner that is the same as and/or similar to the manner of operation of one or more embodiments of the proximity payment device 100 described herein.

In some embodiments, lettering (not shown) or other symbols (not shown) may be present on the front surface 1412 of the card-shaped body 1402 and/or on the rear surface (not shown) of the card-shaped body 1402. The proximity payment card 100 may have one or more magnetic stripes (not shown) on the card-shaped body 1402 to allow the proximity payment card 100 to be read by a magnetic card reader. In addition, or alternatively, there may be embossed numbers and/or letters on the card-shaped body to indicate one or more account numbers and/or the name of the holder of the proximity payment card 100. In addition, or alternatively, non-embossed printing on the front surface 1412 may indicate the account numbers and/or the holder's name. Still further, the front surface 1412 of the card-shaped body 1402 may carry one or more logos and/or brands, including for example the brand/logo of a national payment card association such as MasterCard International Incorporated. The brand/logo of the issuer may also be present, as well as, for example, a specific card product brand. Other conventional features that may be present on the proximity payment card 100 (though such features are not shown) are an adhesive paper strip to receive the signature of the cardholder, and a security code or the like printed on the adhesive strip.

In some embodiments, as an alternative to powering some or all of the circuitry shown in FIG. 1 from a battery to allow the control/switch monitor circuit 112 to detect actuation of the switch, the circuitry may instead be powered by a storage capacitor that has been suitably charged. In addition or alternatively, the time period for enablement of the proximity payment device may be measured out by a capacitor that is charged to start the time period, and then discharges to measure out the time period. The state of the latter capacitor may be monitored by, e.g., the control/switch monitor circuit 112 to determine whether the proximity payment device 100 should respond to any interrogation signal that it may receive.

In another embodiment, the switch 110 may be coupled to a processing/control circuit (not shown) that is separate from the data storage circuit 104 and the transmit/receive circuit 108. For example, the switch may be coupled to the control circuit used for controlling other functions in the device (such as wristwatch functions). In response to the switch being actuated, the control circuit may enable the RFID IC for a payment transaction for a measured time period. In this case, the payment aspects of the device may be powered entirely by the interrogation signal from the POS terminal.

In some embodiments one or more of the circuits of the proximity payment device may include an enable line that may be used to enable and/or disable the proximity payment device. In some embodiments, methods in addition to and/or in lieu of those described herein may be employed to enable and/or disable the proximity payment device.

The proximity payment device may be a wristwatch, a wristband, a bracelet, a pendant or may be in another form. Consequently, the housing 102 may be the case of a wristwatch, a wristband, a bracelet, a pendant or another form.

As used herein and in the appended claims, "proximity payment device" refers to any device, of any shape, which transmits to a point of sale terminal, by wireless transmission, a payment account number. As used herein and in the appended claims, a payment account number may be numeric, non numeric and/or a combination thereof.

One or more of the proximity payment devices may also have a contact interface like that of a conventional smart card that includes a contact interface.

As used herein and in the appended claims the term "identification token" refers to a device, of any shape, that serves as one or more of a proximity payment device, a transportation related device, an identification device, an RFID-enabled passport.

The principles taught herein have heretofore been described in the context of proximity payment devices. Nevertheless, these teachings are also applicable to any type of identification token. As used herein and in the appended claims the term "identification token" refers to a device, having a card shape or any other shape, that serves as one or more of a proximity payment device; a transportation related device; a device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

As used herein, an account number may be numeric, non numeric and/or a combination thereof.

Notably, the size of the IC card compared to the rest of the structure may be different than shown. In some embodiments, the IC card may be the same size as the rest of the structure to which it is attached or even larger than the rest of the structure to which it is attached.

As used herein, the term surrounding includes both completely surrounding and partially surrounding. Thus, a surrounding card may be a completely surrounding card and/or a partially surrounding card.

The above description and the accompanying drawings should not be understood to imply a fixed order for performing the method steps. Rather, the method steps may be performed in any order that is practicable.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus comprising:
   a support structure;
   a storage circuit mounted in or on the support structure, the storage circuit for storing data;
   an antenna mounted in or on the support structure and coupled to the storage circuit for selectively transmitting the data;
   a switch mounted in or on the support structure, the switch to be actuated by a user;
   a timing circuit mounted in or on the support structure, the timing circuit defining a time period during which the apparatus is to be enabled to be operative to perform a data exchange with a reader via the antenna;
   a control circuit coupled to the switch and the timing circuit, the control circuit to detect an actuation of the switch and in response to the detected actuation of the switch to initiate the time period defined by the timing circuit;
   wherein the apparatus is operative to perform the data exchange with a reader via the antenna only during the time period the apparatus is enabled; and
   wherein the apparatus is disabled to perform data exchange after an exchange of data with the reader during the time period or after an end point of the time period is reached.

2. The apparatus of claim 1, wherein the storage circuit, the timing circuit and a circuit to detect actuation of the switch are all implemented in a radio frequency identification (RFID) integrated circuit (IC) that is mounted in or on the support structure.

3. The apparatus of claim 1 wherein the apparatus is operative to perform data exchange with a reader via the antenna only if an account number has not been transmitted.

4. The apparatus of claim 1 wherein the storage circuit stores an account number and the apparatus is operative to perform data exchange with a reader via the antenna only if the account number has not been transmitted.

5. The apparatus of claim 1 further comprising:
   a switch electrically connected in series with the antenna.

6. The apparatus of claim 1 further comprising:
   a power source; and
   a switch electrically connected in series with the power source.

7. The apparatus of claim 1 further comprising:
   a circuit electrically connected in series with the antenna only during the time period.

8. The apparatus of claim 1 further comprising:
   a power source; and
   a circuit electrically connected in series with the power source only during the time period.

9. The apparatus of claim 1, wherein the switch comprises at least one of an accelerometer, a rotation sensor, a velocity sensor and a position sensor.

10. The apparatus of claim 1, wherein the switch comprises an accelerometer.

11. The apparatus of claim 1 further comprising:
    an indicator to indicate whether the apparatus is operative to perform data exchange.

12. The apparatus of claim 1 wherein the support structure comprises a case for at least one of a wristwatch, wristband and pendant.

13. A method of operating an identification token, the method comprising:
    detecting actuation of a switch on the identification token by a control circuit coupled to the switch and a timing circuit mounted in or on the identification token;
    in response to the detected actuation of the switch by the control circuit:
       initiating a time period, defined by the timing circuit, during which the identification token is enabled to perform a data exchange with a reader via an antenna mounted in or on the identification token;
       determining an end point of the time period has occurred; and
       disabling the identification token in response to: the end point of the time period being reached or after an exchange of data during the time period.

14. The method of claim 13, wherein the timing circuit includes a counter or a capacitor.

15. The method of claim 13, wherein the determining an end of the time period comprises using a mechanical device or an electrical or electronic timing circuit to determine the end of the time period.

16. The method of claim 13, further comprising disabling the exchange of data by the identification token if an account number has been transmitted.

17. The method of claim 13 wherein enabling the identification token comprises:
   controlling a switch in series between an RFID integrated circuit and an antenna for transmitting data.

18. The method of claim 13 wherein enabling the identification token comprises:
   controlling a switch in series between an RFID integrated circuit and a power source.

19. The method of claim 13, wherein the switch comprises at least one of an accelerometer, a rotation sensor, a velocity sensor and a position sensor.

20. The method of claim 13, wherein the switch comprises an accelerometer.

21. The method of claim 13, further comprising:
   storing an account number; and
   disabling the identification token if the account number has been transmitted.

22. The method of claim 13, further comprising:
   storing an account number; and
   disabling the identification token upon transmitting the account number.

* * * * *